United States Patent
Bennett et al.

(10) Patent No.: US 7,209,950 B2
(45) Date of Patent: Apr. 24, 2007

(54) METHOD AND APPARATUS FOR A NETWORK INDEPENDENT SHORT MESSAGE DELIVERY SYSTEM

(75) Inventors: Simon Bennett, Santiago (CL); Luis Samra, Miami, FL (US); Gustavo Jimenez, Plantation, FL (US)

(73) Assignee: ZonaMovil.com, Inc., Miami, FL (US)

( * ) Notice: Subject to any disclaimer, the term of this patent is extended or adjusted under 35 U.S.C. 154(b) by 515 days.

(21) Appl. No.: 09/921,167

(22) Filed: Aug. 2, 2001

(65) Prior Publication Data

US 2002/0112014 A1 Aug. 15, 2002

Related U.S. Application Data

(60) Provisional application No. 60/225,603, filed on Aug. 15, 2000.

(51) Int. Cl.
*G06F 15/16* (2006.01)
*H04L 29/08* (2006.01)

(52) U.S. Cl. .................. 709/206; 709/238; 709/230; 455/414.4

(58) Field of Classification Search .......... 455/414.1, 455/414.2, 414.3, 414.4, 456.3, 414, 428, 455/517, 518, 522, 560; 709/206, 246; 370/351–355, 370/466–469, 401
See application file for complete search history.

(56) References Cited

U.S. PATENT DOCUMENTS

| | | | | |
|---|---|---|---|---|
| 5,621,727 A | | 4/1997 | Vaudreuil | |
| 5,852,660 A | * | 12/1998 | Lindquist et al. | 379/230 |
| 5,903,726 A | * | 5/1999 | Donovan et al. | 709/206 |
| 6,018,657 A | * | 1/2000 | Kennedy et al. | 455/426.1 |
| 6,094,578 A | * | 7/2000 | Purcell et al. | 455/426.1 |
| 6,094,587 A | * | 7/2000 | Armanto et al. | 455/567 |
| 6,097,960 A | * | 8/2000 | Rathnasabapathy et al. | 455/461 |
| 6,263,212 B1 | * | 7/2001 | Ross et al. | 455/466 |
| 6,363,431 B1 | * | 3/2002 | Hammer et al. | 709/249 |
| 6,462,646 B2 | * | 10/2002 | Helferich | 340/7.21 |
| 6,535,746 B1 | * | 3/2003 | Yu et al. | 455/466 |
| 6,549,937 B1 | * | 4/2003 | Auerbach et al. | 709/206 |
| 6,560,456 B1 | * | 5/2003 | Lohtia et al. | 455/445 |
| 6,603,974 B1 | * | 8/2003 | Rollender | 455/466 |
| 6,735,439 B2 | * | 5/2004 | Bowman et al. | 455/427 |
| 2001/0016495 A1 | * | 8/2001 | Chandnani et al. | 455/445 |
| 2002/0032800 A1 | * | 3/2002 | Puuskari et al. | 709/246 |
| 2004/0171396 A1 | * | 9/2004 | Carey et al. | 455/466 |

FOREIGN PATENT DOCUMENTS

| | | |
|---|---|---|
| EP | 0 777394 A1 | 6/1997 |
| EP | 777394 A1 * | 6/1997 |

(Continued)

*Primary Examiner*—Nathan J. Flynn
*Assistant Examiner*—Ashok Patel
(74) *Attorney, Agent, or Firm*—Norman E. Henderson

(57) ABSTRACT

Techniques are described for facilitating communication among a plurality of different telecommunications systems. Communications from a sending network are forwarded to a server that places the communications in a format acceptable to a second receiving network. The server maps an incoming message into any one or more of a variety of formats in accordance with a format acceptable by a receiving network. These communications may include, for example, short messages service (SMS) messages in which the sending and receiving telecommunications systems each have different routing information, such as different electronic addressing formats.

38 Claims, 18 Drawing Sheets

FOREIGN PATENT DOCUMENTS

| | | |
|---|---|---|
| EP | 0 959600 A1 | 11/1999 |
| EP | 959600 A1 * | 11/1999 |
| WO | WO 97/20442 | 6/1997 |
| WO | WO 97/36434 | 10/1997 |
| WO | WO 9810608 A3 * | 3/1998 |
| WO | WO 99/11078 | 3/1999 |
| WO | WO 99/33226 | 7/1999 |
| WO | WO 9933226 A1 * | 7/1999 |
| WO | WO 00/41533 | 7/2000 |

* cited by examiner

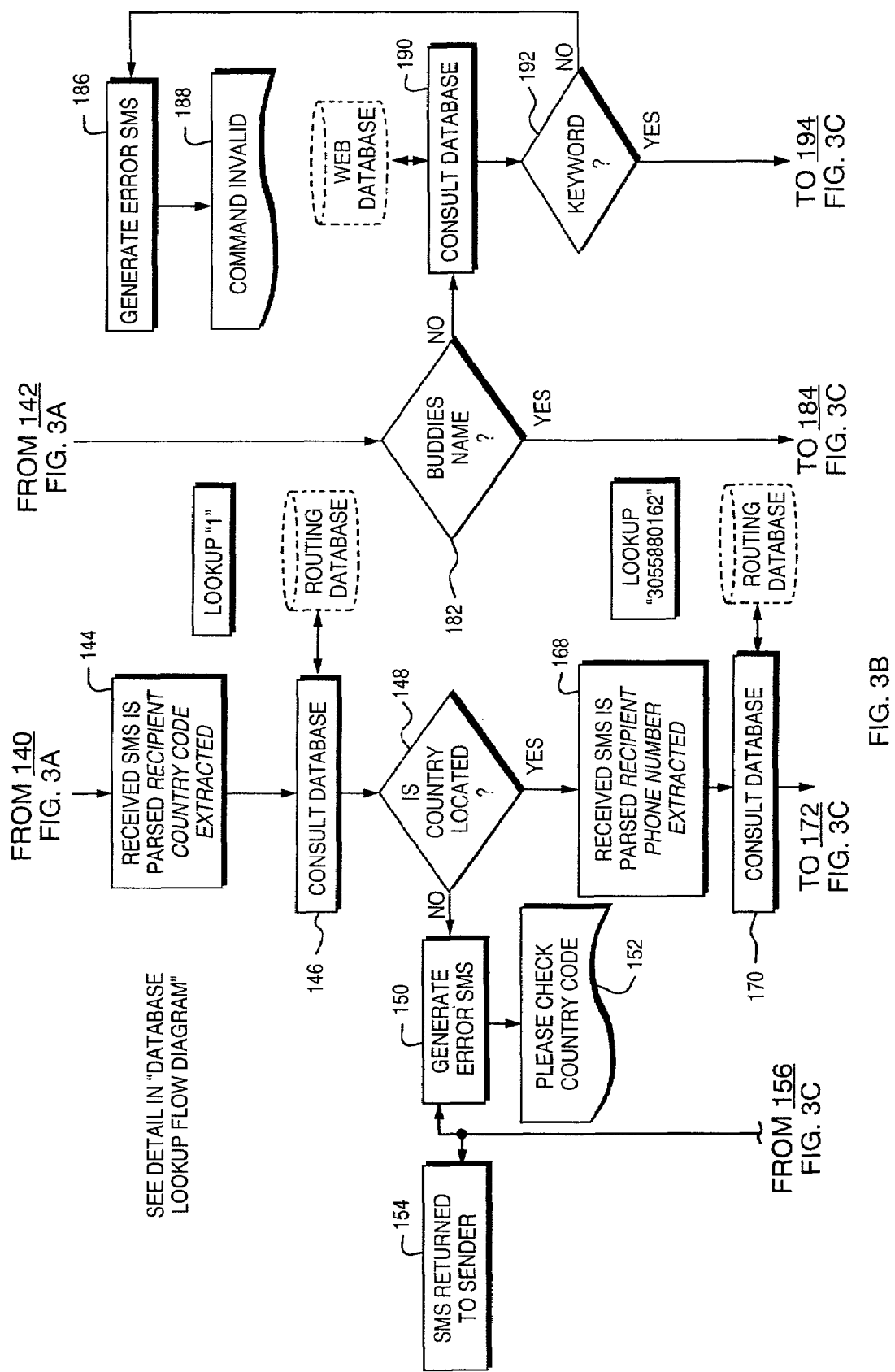

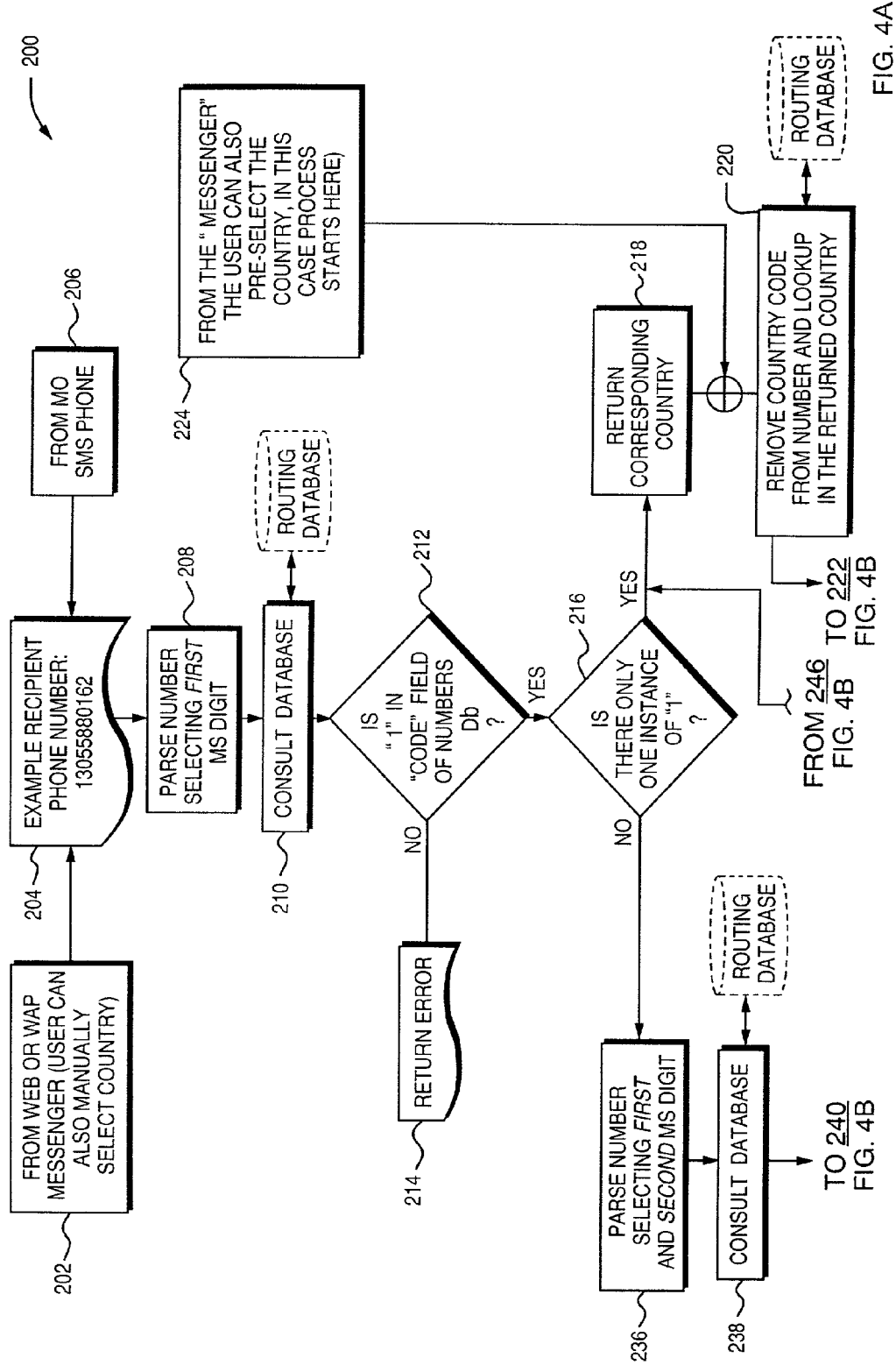

EXAMPLE OF CONTENTS OF "STUFFING" TABLE 402

| FORMAT 402a | STUFF_CODE 402b | COMMENTS 402c |
|---|---|---|
| NO COMMENTS | 0 | |
| (number)@email | 1 | |
| (prefix)(number)@email | 2 | |
| (stuffed"0")(prefix"15")(number)@email | 3 | |
| (stuffed"1")(area)(number)@email | 4 | |
| (stuffed"15")(number)@email | 5 | |
| (stuffed"52")(prefix)(number)@email | 6 | |
| (stuffed"0")(prefix)(number)@email | 7 | |
| "mensajes"@email | 8 | CELCO X...ALL EMAILS ARE SENT TO mensajes@email |
| "nexmail"@email | 9 | CELCO Y...ALL EMAILS ARE SENT TO nexmail@email |
| (stuffed "706")(number)@email | 10 | CELCO W |
| (stuffed "076")(number)@email | 11 | CELCO W |
| (NUMBER) | 12 | http://web.wepostapp.com/application |
| (NUMBER) | 13 | |

FIG. 9

EXAMPLE OF CONTENTS OF "CELCOS" TABLE 404

| CELCOID 404a | CELCO 404b | CELCO_EMAIL 404c | STUFF_CODE 404d | MSG_CODE 404e | COUNTRY 404f | CONNECTION 404g | NUMBER_CHARS 404h | URL 404i |
|---|---|---|---|---|---|---|---|---|
| CTIARGE | CTI argentina | cti.comar | 2 | 0 | AR | email | 100 | www.cti.com |
| BAHACELL | Baja celular | bajacelular.commx | 6 | 0 | MX | email | 100 | www.baja.com |
| IUSCELL | Iusacell | iusacell.commx | 2 | 0 | MX | email | 100 | www.iusa.com |
| NORCEL | Norcel | norcel.commx | 6 | 0 | MX | email | 100 | www.norcel.com |
| PORTACEL | Portatel | unknown | 0 | 0 | MX | | 100 | www.porta.com |
| TELCELMX | Telcel Mexico | unknown | 0 | 0 | MX | | 120 | www.telcel.com |
| BELLPE | BellSouth Peru | unknown | 0 | 0 | PE | | 115 | www.bspe.com |
| NEXTELPERU | Nextel Peru | nextel.compe | 9 | 3 | PE | email | 115 | www.nxtl.com |
| TELEFOPE | Telefonia Peru | telefon.compe | 8 | 4 | PE | email | 130 | www.telepe.com |
| 6462 | 360 COMMUNICATIONS-VIRGINIA | atel.com | 2 | 0 | US | email | 120 | www.atel.com |
| 6228 | AB CELLULAR HOLDING | mobile.att.net | 2 | 0 | US | SMPP | 120 | www.att.com |

EXAMPLE OF CONTENTS OF "NUMBERS" TABLE 406

| CELCOID 406a | CODE 406b | PREFIX 406c | N_FROM 406d | N_TO 406e | FN_FROM 406f | FN_TO 406g | RECORDID 406h |
|---|---|---|---|---|---|---|---|
| TELEFOPE | 51 | 1 | 8600000 | 8699999 | 18600000 | 18699999 | 1 |
| TELEFPPE | 51 | 1 | 9600000 | 9999999 | 19900000 | 19999999 | 9 |
| BELLPE | 51 | 1 | 9500000 | 9599999 | 19500000 | 19599999 | 15 |
| NEXTELPERU | 51 | 1 | 8100000 | 8199999 | 18100000 | 18199999 | 16 |
| BAHACELL | 52 | 1 | 1010000 | 1016999 | 11010000 | 11016999 | 17 |
| BAHACELL | 52 | 6 | 6910000 | 6919999 | 66910000 | 66919999 | 99 |
| BAHACELL | 52 | 113 | 95000 | 96999 | 11395000 | 11396999 | 103 |
| IUSACELL | 52 | 4 | 7280000 | 7181999 | 47280000 | 47281999 | 462 |
| IUSACELL | 52 | 4 | 7282000 | 7282999 | 47282000 | 47282999 | 463 |
| NORCEL | 52 | 17 | 450000 | 459999 | 17450000 | 17459999 | 1029 |
| NORCEL | 52 | 17 | 460000 | 469999 | 17460000 | 17469999 | 1030 |
| NORCEL | 52 | 17 | 580000 | 589999 | 17580000 | 17589999 | 1031 |
| NORCEL | 52 | 169 | 10000 | 19999 | 16910000 | 16919999 | 1032 |
| PORTATEL | 52 | 93 | 906000 | 909999 | 93906000 | 93909999 | 1190 |
| PORTATEL | 52 | 93 | 930000 | 935999 | 93930000 | 93935999 | 1191 |
| TELCELMX | 52 | | 59840000 | 59849999 | 59840000 | 59849999 | 3805 |
| TELCELMX | 52 | | 59910000 | 59919999 | 59910000 | 59919999 | 3906 |
| TELCELMX | 52 | | 59950000 | 59959999 | 59950000 | 59959999 | 3807 |
| TELCELMX | 52 | | 59970000 | 59979999 | 59970000 | 59979999 | 3808 |
| CTIARGE | 54 | 11 | 41500000 | 41509999 | 1141500000 | 1141509999 | 3809 |
| 6462 | 1 | 804 | 9890000 | 9899999 | 8049890000 | 8049899999 | 8120 |
| 6462 | 1 | 804 | 9960000 | 9969999 | 8049960000 | 8049969999 | 8121 |
| 6228 | 1 | 310 | 2000000 | 2009999 | 310200000 | 3102009999 | 8122 |

EXAMPLE OF CONTENTS OF "MESSAGE TYPE" TABLE 408

| TYPEID 408a | TYPEDESC 408b | COMMENTS 408c | APPLICATION DESTINATION 408d |
|---|---|---|---|
| 0 | Put [Message] In The Email Body | normal | |
| 1 | Put [Message] In The Email Subject | | |
| 2 | Put [subject] [Message] In The Email Subject | celco A | |
| 3 | Put [Stuffed Number [Message]] in Email Subject | celco Z | |
| 4 | Put [Stuffed number] in Email Subject, [Message] in The Email Body | Celco B | |
| 5 | Call Web posting: | Celco C | http://web.wepostapp.com/ |
| 6 | Call direct SMSC connection application: | | application |

FIG. 12

EXAMPLE OF CONTENTS OF "COUNTRY SPECS." TABLE 410

| COUNTRY 410a | CODE 410b | DIGITS 410c | MIN_EXAMPLE 410d | HELP_SPAN 410e | HELP_ENG 410f | HELP_PORT 410g | COMMENTS 410h |
|---|---|---|---|---|---|---|---|
| AR | 54 | 10 | 11(SIN "15") 412356 | HELP TEXT IN SPANISH | HELP TEXT IN ENGLISH | HELP TEXT IN PORTUGESE | NOTES |
| BR | 55 | 10 | 2712345 | | | | |
| EEUU | 1 | 10 | 305123456 | | | | |

FIG. 13

METHOD AND APPARATUS FOR A NETWORK INDEPENDENT SHORT MESSAGE DELIVERY SYSTEM

CROSS REFERENCES TO RELATED APPLICATIONS

This application claims priority from U.S. provisional patent application No. 60/225,603 filed on Aug. 15, 2000.

BACKGROUND

This application generally relates to telecommunications, and more particularly to unification of different messaging systems as may be used in a telecommunication system.

Messaging systems, such as those used in cellular networks for mobile telecommunications, may each employ their own messaging and address formats. This may pose a problem when a message is routed between two different cellular networks. An example of this may occur, for example, when a user from one cellular network or carrier sends a message to another user on a different cellular network.

One particular type of messaging format and service is called the Short Message Service (SMS). In particular with SMS, each SMS message is routed through the mobile network operator network of the receiver of a message. When a sender and receiver are not within the same cellular network, problems may occur in sending messages such as those in accordance with differing SMS formats addressing and protocols used in different networks in connection with the SMS message. The Short Message Service Centers (SMSC) within each particular network such as those used in connection with SMS messages may not comply to any single standard. Compatibility may only be guaranteed within a single digital mobile network. For example, a Global System for Mobile communications (GSM) type of network is a primary system for the SMS implementation network used in Europe. Other regions, such as North and South America, may use different mixed technologies in cellular networks, for example, such as Advanced Mobile Phone Service AMPS Time Division Multiple Access (TDMA), Code Division Multiple Access (CDMA) as well as GSM. SMSC manufacturers may also each implement different protocols further compounding the mixed varying technologies. Thus, communications between a sender and receiver in which the sender and receiver each use different digital mobile networks, and thus possibly different technologies and standards, may have problems in sending messages between networks.

Thus, it may be desirous and advantageous to have an efficient and improved technique which provides for the unification of different SMSCs, and associated message formats that may be used in different telecommunication systems. It may be desirous and advantageous to provide for improved efficient and more streamlined message sending from a user to a receiver in which the user and the receiver may be in different networks that may not be in accordance with the same messaging standards.

SUMMARY OF THE INVENTION

In accordance with one aspect of the invention is a method executed in a computer system for routing a message from a sender in a first digital mobile network to a receiver in a second different digital mobile network. The message may also be sent from a web page, in either case, a message is forwarded from a sender to a server. The server is connected to the first and second digital mobile network. A routing database is used to relate an identification number associated with the receiver to corresponding routing path information associated with the second digital mobile network. The message is forwarded to the receiver in accordance with the corresponding routing path information.

In accordance with another aspect of the invention is a computer program product for routing a message from a sender in a first digital mobile network to a receiver in a second different digital mobile network. The message may also be sent from a web page, in either case, a message is forwarded from a sender to a server. The server is connected to the first and second digital mobile networks. A routing database is used to relate an identification number associated with the receiver to corresponding routing path information associated with the second digital mobile network. The message is forwarded to the receiver in accordance with the corresponding routing path information.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9–13 are more detailed examples of tables included in the representation of data in FIG. 8.

DETAILED DESCRIPTION OF EMBODIMENT

Figure 1:
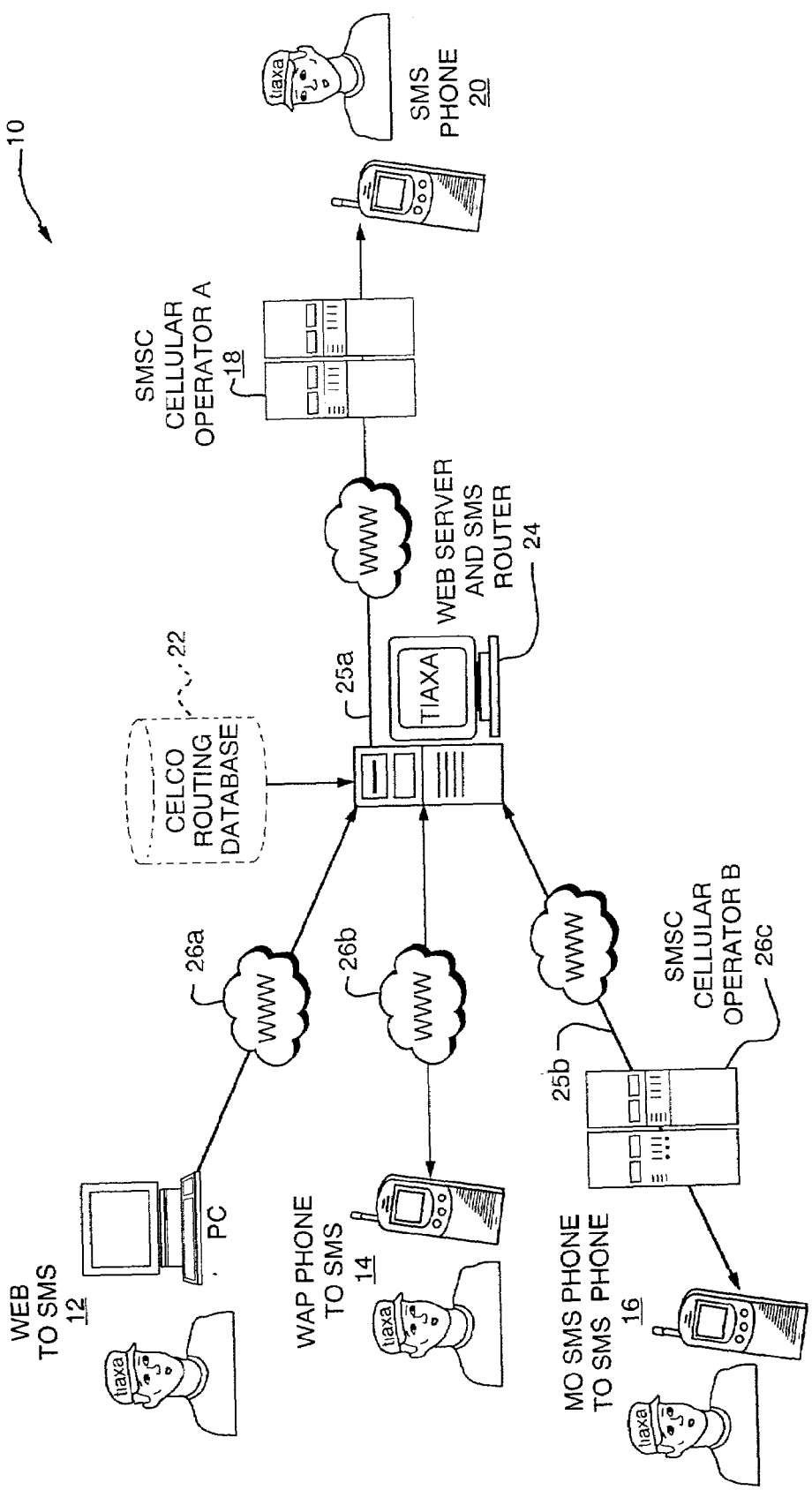
FIG. 1 is an example of an embodiment of a multi mobile network operator network short message delivery system in a hub formation.

Referring now to FIG. 1, shown is an example of an embodiment of a multi-mobile network operator network short message delivery system. It should be noted that although the description included herein relates to SMS as may be routed through mobile network operator networks, the general principles and teachings described in the paragraphs that follow may be generally extended to other types of digital mobile networks employing one or more of a variety of communication devices, and other types of messaging services.

Included in the multi-mobile network operator network short message delivery system 10 or SMS system 10 is a hub-like network structure that includes a plurality of different types of connections to a server 24. Generally, the structure shown in the system 10 is a hub-like structure having spokes, such as 12, 14, 16 and 20, representing bi-directional communication paths with the hub in which the server 24 is used to route communications between different message senders and receivers within the system 10.

The system 10 of FIG. 1 shows different users 12, 14, and 16 sending an SMS message to an end user 20 through a server 24 using a routing database 22.

It should be noted that the routing database 22 may include information in addition to routing information as may be described herein. For example, the routing database may also include additional information on registered users of the server 24, recipients of messages, and other data that may be described in connection with other flowcharts and descriptions herein.

The user 12 sends an SMS message using the "web" or internet, for example, such as a user connected on a personal computer (PC) through the World Wide Web (WWW) 26a. This message is forwarded from sending user 12 through the server 24 to the SMS mobile network operator 18 to the end user 20. Similarly, a sender 14 of a message may use a WAP (wireless application protocol) phone using the WWW 26b to connect and send a message through the server 24, to mobile network operator 18 to end user 20 on the SMS phone or other type of cellular device. Similarly, user 16 may send a message via a (Mobile Originating) MO SMS phone to an end user 20 on the SMS phone through a similar path through the mobile network operator 26c, server 24 using the database 22 and then to the mobile network operator 18 which then reaches the SMS phone of the end user 20.

As illustrated in FIG. 1 with three messaging scenarios, the server 24 is the message broker. The incoming and outgoing messaging types may be different or the same. The messaging parts of the three messaging scenarios of FIG. 1 are independent of one another, and logically linked via the database.

It should be noted that as described in this application, "cellular" or "cell phone" may imply any type of a device, such as a mobile device, with messaging capabilities. Generally, the mobile device such as a cellular phone, pager, wireless hand-held organizer and the like may be used as a point of origination or termination with regard to message sending and receiving. In other words, such a device may be used in sending a message, such as from users 12, 14 and 16, and also as a device for receiving a message, such as by user 20. Generally, the device may refer to a cellular phone using cellular telephony, paging, wireless hand-held organizers and any other such mobile, radio frequency connected numeric or other type of alpha numeric display device. Generally, as known to those skilled in the art, SMS uses capacity in a data channel of digital mobile equipment to transmit text and binary messages to subscriber cell phones or pagers. In other words, a subscriber may use a cell phone or pager to receive a message, for example, as indicated by user 20 in the system 10 of FIG. 1.

SMS connectivity and SMSCs may comply with any singular standard. Compatibility may be achieved normally only within a single digital mobile network. For example, Global System for Mobile Communications (GSM) is an example of an SMS implementation in which GSM is principally found in Europe and generally employed by a plurality of different digital mobile networks. Thus, sending messages in SMS format between digital mobile networks, for example, in Europe is more unified. A sender and a receiver may communicate with less difficulty, for example, in Europe than in another region such as North or South America, where there may be a higher occurrence of mixed technology of digital mobile networks, for example, such as AMPS, TDMA, CDMA and GSM. Additionally, SMSC manufacturers are diverse each with their own protocol which may also cause problems in communicating between different networks.

The WAP is one of a variety of cellular phone based microbrowser technologies permitting the user to be able to access traditional and modified content and applications from the Internet, as shown, for example, in the system 10 of FIG. 1. It is understood that WAP is used herein as an example of a mobile device with browser. The device may comply with various standards as may be used in connection with a mobile browser device, such as a I-mode handset, or Wireless PDA with proprietary micro browser, and the like.

As will be described in paragraphs that follow, and with reference to the system 10 of FIG. 1, the techniques described herein may be used to unite different platforms, messaging formats, geographic locations, cellular technologies and/or messaging types using a common point of entry exchange and application with transparency and seamless message sending to the sender and one or more message recipients.

For example, as described in paragraphs that follow, FIG. 1 shows a system 10 which may be used in connection with sending and receiving a message on two different digital mobile network, such as Voicestream and AT&T Wireless.

Short messaging as may be used in connection with SMS generally involves the transmission of short, text and/or numeric messages, between a message handling system and a mobile subscriber. For example, a message may be up to 140 octets carrying up to 160 characters of text. In some systems, short messages may be used, for example, in connection with paging. Applications, such as those that obtain stock quotations, weather and traffic and news information as well as sports broadcasting information, may also use a short message to transmit information in connection with these applications. For example, if a user wants to know what the weather is in a particular city, a subscriber of a particular digital mobile network may contact or send a message to the cellular operator of the network. In return, the particular user may receive a short message describing the weather associated with the city of interest specified in the previous request.

As may be known, for example, in connection with the use of digital mobile networks but omitted from the system 10 of FIG. 1 for the sake of simplicity, each SMS message may be routed through the mobile network, between base stations, main switches and then short message service centers or SMSCs. Referring to the system 10 of FIG. 1, SMSCs, for example, may be cellular operators 18 and 26c. The SMSCs may optionally offer connectivity to other external sources in addition to messaging services within the individual mobile network operators closed network.

Short messages may be sent from a first, sending user, such as user 12, to end user 20 as may defined in accordance with the database 22. The sender of a message may identify a destination associate with an end user, a corresponding device, and a user's mobile identification number (MIN) or phone number.

Figure 1A:
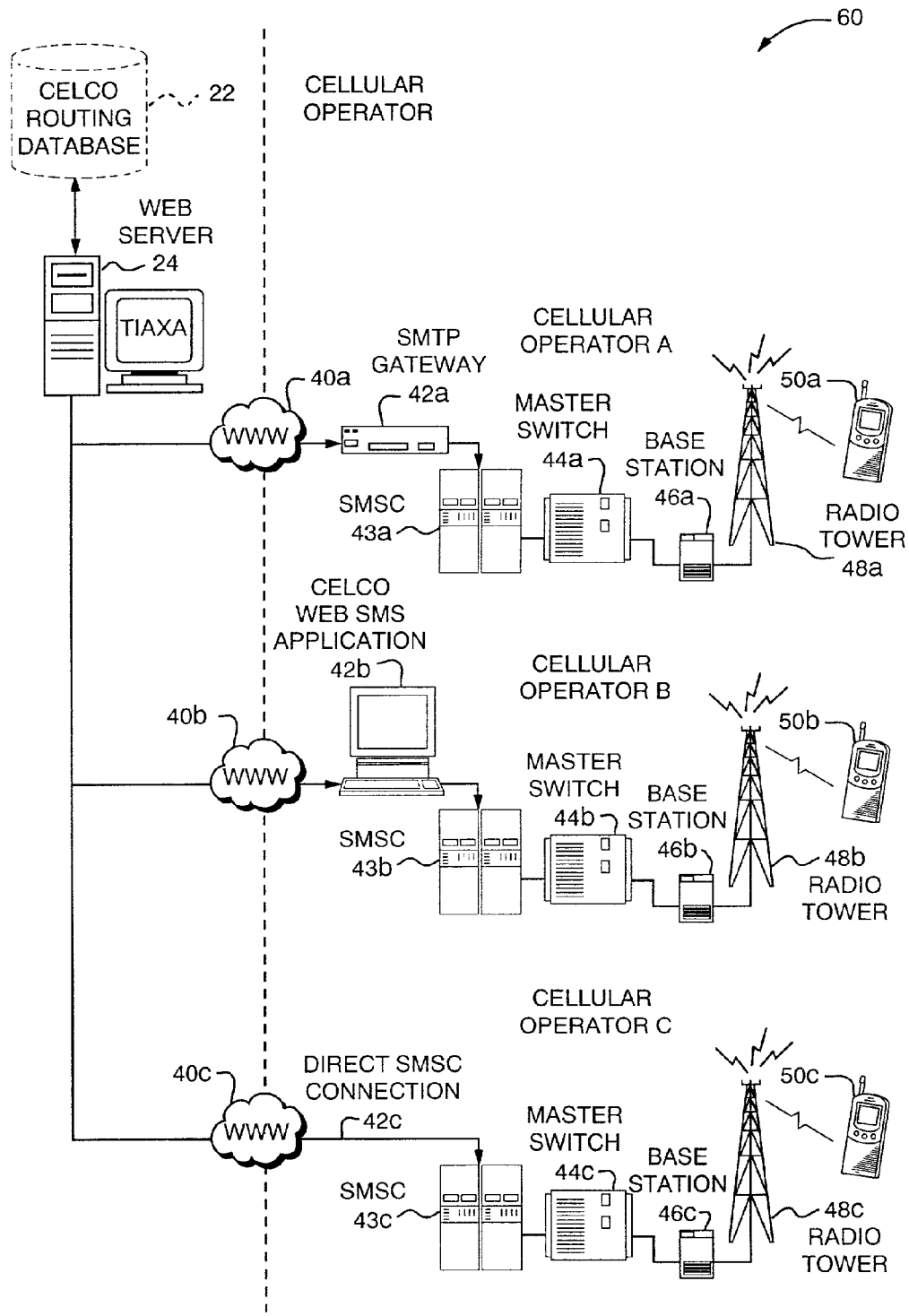
FIG. 1A is a more detailed example of a portion of the network of FIG. 1.

It should be noted that although FIG. 1, 1A and other may show a connection medium as being the internet or WWW and associated HTTP protocol and standard, it should not be construed as a limitation. Other connectivity options are possible as described in more detail elsewhere herein.

Referring now to FIG. 1A, shown is an example of another embodiment of a portion of the network 10 of FIG. 1. Generally, FIG. 1A shows a more detailed description of the components previously included in FIG. 1. FIG. 1A additionally includes detail regarding particular hardware that may be included in the network 10. The particular hardware, may be, for example, owned or leased by a particular digital mobile network to provide services therein.

In particular, FIG. 1A shows more detail of one representation of how messages may be routed within a particular cellular network. It should be noted that the rearrangement of the components does not functionality different from that previously described in connection with FIG. 1. In other words, for example, the functionalities as described in connection with FIG. 1 also apply to FIG. 1A in which two-way communications or bidirectional communications may occur between two different users such as 50a and 50b in different networks such as cellular network A and B, respectively. Messages between these two users in two different networks may be made possible through the server 24 and the database 22.

In the arrangement shown in FIG. 1A, a message may be sent from a first user with a cell phone 50a to a second user, for example, having a cell phone 50b. User on cell phone 50a is included in cellular network A, and user on cell phone 50b is included cellular network B. The SMS message, for example, from the device 50a may be routed through the cellular operator A's network. An SMS message originating from the device of user 50a, for example, may be transmitted to the radio tower 48a, to base station 46a, through the master switch 44a and the SMSC 43a to the SMPT gateway 42a using the worldwide web (WWW) 40a.

From this connection, the message may be routed to the server 24 to obtain information for appropriately routing the message using the database 22. The server 24 then forwards the message using the web 40b, for example, to the web SMS application 42b as operated within the cellular network B. The message is further forwarded through components, such as the SMSC 43 being the master switch 44b of the cellular network B. Finally, the message may be sent to a base station 46b, and radio tower 48b to reach the device 50b which is capable of receiving the message as sent from the device of the user 50a.

Within the arrangements, for example, shown in FIGS. 1 and 1A, short messages may be received by the server 24 and forwarded to one or more end user in accordance with the SMSC database that includes addressing and messaging format information customized for each particular digital mobile network to which the server 24 is connected. The central routing server 24 includes detailed information about a each mobile network operator, such as:

Routing method and path
Maximum message length
Device type
And also User information, such as:
Device type
Account status
Billing information and privileges With the information, the central server 24 may forward the message in the correct way for the recipient. For example, if a sender's SMS message is 160 characters long but the receiver's SMS messaging system only supports 120 characters, the message is split in to two portions before forwarding, i.e. 1/2 and 2/2. By means of another example: the sender's account may also be consolidated with the SMS usage by providing confirmations of successful message reception back from the recipient.

The forwarding destination may be defined by the MIN or phone number of a particular cellular user. Since the SMSC is connected directly to the master switch and informed by the home location register (HLR) that functions as a part of the master switch as seen in elements 46a, b and c on FIG. 1A. of the cellular phone user's presence on the network, messages may forwarded to the cell phone, for example, when it is switched on. Otherwise, messages may not be immediately delivered and may be accordingly held in storage for a predefined period of time. If these messages, for example, in a particular digital mobile network, are not delivered to a particular user after a predefined period of time, they may be deleted. These messages may be stored upon a computer storage medium, for example, that may be included in the SMSC of a particular user's digital mobile network.

An SMSC, for example, referring to 18 and 26c as shown in FIG. 1 and elements 43a through 43c of FIG. 1A, may receive alpha numeric messages from other cellular subscribers or from external sources. This may be, for example, in connection with mobile originating devices or two-way SMS communication devices.

The mobile network operator may use one of several different types of techniques to enable communications between users on the same or different networks. These different techniques or methods may be chosen, for example, in accordance with the source and destination characteristics for the message. Note that the following that will be described are techniques that may be used in connection with forwarding an SMS message from one digital mobile network to a destination digital mobile network.

Messages may be received by a user, for example, in connection with voice phone calls that are forwarded by an operator that may be at the SMSC. The operator may manually type in the message via a remote terminal connected to the SMSC which may then be forwarded to the destination user. As an example, someone may leave a voicemail message for the user 20. Rather than have a first user send an e-mail or other type of text message directly, the first user may speak with an operator who transcribes the message from a remote terminal connected to the SMSC. Other techniques may be used in connection with transforming a voice communication to a written electronic communication, for example, using software and/or hardware that automatically converts a voice communication to an electronic communication, such as an e-mail message. This message may then be relayed to the end user's cellular device from the SMSC, for example, such as between 18 and 20 referring to the system 10 of FIG. 1.

Messages may also be entered via a remote terminal of the SMSC using a web page associated with a particular cellular operator/network. In one example, the SMS message forwarded to the user is within a particular digital mobile network and data may be entered using the web such as 26a as a connection. A user such as 12 referring to the system 10 of FIG. 1 may enter information into a web page serving as a data form. A message is produced in accordance with data entered into the web page, and then forwarded to a destination which may be within the same digital mobile network. This data form as a web page may be used by a user sending a message from any one of a variety of communication devices, such as, for example, a hand-held device, cellular telephone, or terminal connected to a system capable of communications in accordance with the HTTP message protocol.

SMTP gateways, such as used for sending standardized e-mail messages, may be enabled at the SMSC allowing e-mails to be converted into SMS messages. This may be shown, for example, with reference to FIG. 1A, network 60, cellular operator A in which the SMTP gateway 42a may be used, for example, to convert a received or incoming e-mail message in the Digital mobile network A sent from a user on another system into an SMS format that may be displayed, for example, on the user's device 50a. In this example, the e-mail may be addressed to the user's MIN or phone number at the cellular operator's URL. For example, to send an SMS message to Bob whose cell phone number is 23674 on network X, the e-mail may be sent to 23674@networkx.com. The e-mail subject text and message body may be sent as the SMS message content. This will be described in more detail in paragraphs that follow.

Messages may also be sent to an SMSC using a software program, such as 42b, that format incoming messages according to the type of format of a receiving SMSC. Connection mediums that may be used are diverse data transport systems including, for example, modems, ISDN, frame relay, X.25 packet switch networks, or TCP/IP. This may be illustrated, for example, with reference to the network 60 of FIG. 1A, cellular operator C using the direct SMSC connection 42c, the SMSC 43C to perform any translation or reformatting of data necessary to further relay an incoming message in the form of an SMS message format to the user 50c.

Messages and commands may originate from devices with mobile origination (MO) device capacity. This may be routed to a particular SMSC from a device's "home" or originating SMSC.

The mobile network operator of one or more digital mobile networks as previously explained may use any of the foregoing techniques as well as others to enable communications between users in the same or different networks. End point users may be identified, for example, by a MIN or phone number included, for example, in the message entered via the web page, or e-mail, or other type of communication which is converted to an SMS format.

Generally, a sending user may associate a name and a phone number or MIN, for example, as identifying indicia of an end point or end user who is the target recipient of a message. Users may not be concerned with details relating to the formatting of each particular network and may rather have the details appear "invisible" by a seamless transfer of a message between users within the same and/or different networks. Using techniques that are described herein, the process of forwarding messages from any one of a variety of these different sources to a particular user of a network regardless of whether the networks are the same or that they are different networks having different protocols and other types of incompatibilities may be streamlined.

As described herein, users of different or the same networks may be provided with services for streamlining SMS based messaging services. Mobile originating SMS messages may pass from one device to another regardless of the operator, location or network technology. To simplify the messaging process, mapping or translation of the different formats in accordance with the different sources and destinations, hardware and protocol differences are accounted for and handled by the server using a routing database. Thus, users are not encumbered by the details of the different types of connections facilitating a smooth transition of messages between different networks which may otherwise be incapable in accordance with different formats and protocols and the like.

Referring back to FIG. 1, the user 12 may use a personal computer that is capable of reading HTML. The terminal may further be connected to the WWW using HTTP protocol format for connecting to the server 24. The user 14 may have a wireless access protocol (WAP) phone or other WAP device capable of understanding the wireless mark-up language (WML) and may communicate with the server 24 in accordance with the HTTP protocol.

Generally, there are different scenarios for messaging which involve one-way as well as bi-directional or two way communications between users. As described elsewhere herein, communications may occur between a cell phone and the server 24, such as the TIAXA server. As an example of a one-way communication, a user may enter information that is sent to the TIAXA server, for example, in connection with entering database information. The database information may be information identifying the sending user, or one or more end users. The entry, for example, may be from a personal computer, may use the web or from a cell phone.

A second type of one-way messaging involves information "pull" between a cell phone or user of a digital mobile network and the server, for example, for inquiries such as about the weather in Miami.

A third type of service provided within or between digital mobile networks involves a relay servicing of messages. For example, a user may contact one or more other users through the server 24 used as a "hub". Referring to FIG. 1 as described elsewhere herein, user 12, for example, may communicate through the server 24 to an end point such as 20. Additionally, a user may forward an SMS message, for example, having multiple end points rather than a single destination.

The server 24 may account for, and facilitate communications between, all combinations of connection types and format cases using the different type of sources for message creation as well as destination in order to map an incoming message to a target. The server 24 may also be used, for example, as a broker, translator or reformatter that has "embedded" knowledge of the source and targets that are possible for the different types of networks. The different formats and the mappings may be performed, for example, using software executing in the server 24 using information stored in the database 22. This type of transaction or mapping may be provided for a streamline appearance to a user in sending a message, for example, on one digital mobile network to another user on another digital mobile network, each having different formats and protocols.

Shown in a table below are the different types of SMSC connectivity options, for example, as may be represented as the connection between the server 24 and each of the SMSC cellular operators such as 26c and 18 referring to the system 10 of FIG. 1.

TABLE 1

SMSC Connectivity Options

| SMSC Manfacturer | Protocol | Transport |
|---|---|---|
| Logica | SMPP, SMPT (email), HTTP | modem, ISDN, X.25, X.31, TCP/IP |
| Lucent | SMPP, SMPT (email), HTTP | modem, ISDN, X.25, X.31, TCP/IP |

TABLE 1-continued

SMSC Connectivity Options

| SMSC Manfacturer | Protocol | Transport |
| --- | --- | --- |
| Motorola | SMPP, SMPT (email), HTTP | modem, ISDN, X.25, X.31, TCP/IP |
| Sema | OIS, SMPP, SMPT (email), HTTP | modem, ISDN, X.25, X.31, TCP/IP |
| ADC Newnet | SMPP, SMPT (email), HTTP | modem, ISDN, X.25, X.31, TCP/IP |
| Comverse | SMPP, SMPT (email), HTTP | modem, ISDN, X.25, X.31, TCP/IP |
| Ericsson MXE | SMPP, SMPT (email), HTTP | modem, ISDN, X.25, X.31, TCP/IP |
| CMG | UCP, SMPT (email), HTTP | modem, ISDN, X.25, X.31, TCP/IP |
| Nokia | CIMD2, SMPT (email), HTTP | modem, ISDN, X.25, X.31, TCP/IP |
| Generic/ Open | TAP, SMPT (email), HTTP | modem, ISDN, X.25, X.31, TCP/IP |

The foregoing table summarizes for each of the different types of SMSC hardware manufacturers the different protocol as well as transport medium that may be used in one particular embodiment at a particular point in time. As additional digital mobile networks, or spokes, are added in connection with the hub (server 24 and database 22), additional protocols, and the like may be added to the above table. It should be noted that the protocol described in column 2 above may represent the communication protocol, for example, used at links 25a and 25b between different SMSC operators and the server 24.

It should also be noted as described in more detail elsewhere herein, the information regarding the protocol and transport medium may be encoded in the database 22 in one or more fields.

As also described herein in one embodiment, the point of entry of a user may be defined as a the web server which is accessible using the internet via a PC, a microbrowser enabled phone with internet capabilities, or through a mobile originating (MO) mobile device such as a cell phone.

It should also be noted that the server 24 in one embodiment hosts the software web pages in the link needed to perform and implement the foregoing techniques. The front end interface, for example, as may be used to display information and the users PC 12 be written using standard internet protocols allowing the user to send SMS messages. The database is described in more detail elsewhere herein and may use any one or more of a variety of commercially available packages, for example, such as may be available from vendors Oracle and/or Sequel.

The hardware of the server 24 may be any one of a variety commercially available hardware processors that may vary in accordance with the traffic the server is handling. In one embodiment, the software that executes on a server 24, for example, may be Windows NT using Sequel, the LINUX operating system, or other UNIX-based operating system using an Oracle database. It should be noted that embodiment may include any combination of hardware and/or software in accordance with the traffic and other types of parameters within a particular system.

Since a variety of different devices may be used to interface to the server 24, different types of user interfaces may have to be tailored or targeted for a particular device. In accordance with standard protocols, different devices may be identified, for example, in incoming messages to the server as part of the message format. This information may be used, for example, to display device specific information. Selection of a particular format and data sent to a particular device may be made by the server 24 in accordance with received device-specific information.

Referring now to FIG. 2, shown is a flowchart of steps of one embodiment from a user-interaction perspective for sending an SMS message. In this example, these steps described are those that may be associated with using the WWW or the internet for sending a message. The steps that will be described in conjunction with FIG. 2, flowchart 70, are those that may be performed when an SMS message is originated from the web, as illustrated by elements 12 and the 14 of FIG. 1.

As described in more detail below, a user may use and access the server 24 and database 22 through the Internet using, for example, a personal computer, microbrowser or any other device providing for interaction with the server 24 of the message delivery system. The user may then register and/or send messages using the server 24. A web page may be displayed to a user in connection with entering message information. Generally, the embodiment described herein may use the routing database to perform queries, for example, to obtain a country specific format of an associated mobile identification number (MIN) when sending a message and/or during registration of a user of the server 24. The routing database may also be queried in connection with determining the existence of a particular user's MIN for an associated country, for example, as may be performed in connection with "sending" a message. Additionally, the routing database may also be queried.

At step 72, the user enters the URL of the website or webpage from the user's device. This URL may be the address of a website and result in a webpage being transmitted and displayed to the user. The user may enter this information, for example, from a personal computer, a wireless access protocol, or "WAP" phone, or other device having internet capabilities. In both of these instances, there may be software and/or hardware associated with the originating device for processing HTML files in accordance with http protocol, for example, such as those included in a browser, and may reside, for example, in a personal computer.

At step 72, the user enters the address of the home page 74 as indicated in the flowchart of FIG. 2. Control proceeds to step 76 where a determination is made as to whether the user is registered. If a determination is made that the user is not registered, control proceeds to step 78 where a user registration process may be performed. For example, a registration process may be performed to register a user, such as 12 or 14 with reference to FIG. 1 using the server 24. This registration process enables the user to send a message, for example, to another user at a different network using the server.

If a determination is made at step 76 that the user is already registered, control proceeds to step 80 where the user sends a message page. As part of the message-sending process, Field 81 outlines those portions of information which may be entered, for example, interactively through a user interface or form display with a web page. As shown at 81, the type of information entered for sending a message may include the user's name, a recipient's name and a recipient's country. Note that if the international number form is used, the recipient's country is not needed. The user's name, the recipient's name, and recipient's country may be, for example, alphanumeric characters. Values associated with these items may be input using forms or web pages written, for example, using HTML processing as interpreted by a browser and may interpreted on an originating message-sender's device, such as a personal computer in connection with sending a message from user's computer 12 or from a particular type of WAP phone 14 capable of interpreting a form of HTML, such as WML.

At step 82, the routing database 22 may be consulted to obtain the country number format. In response to the user selecting the SMS recipient's country as entered at step 81, the database may be consulted to return the correct MIN numbering format as an input example. This may be displayed at step 84 as one of the fields to the sending user. Referring to FIG. 2, flowchart 70, step 84 indicates a field 84*a* which may be output or displayed, for example, on the user's screen to guide completion of a subsequent field 84*b*. These help guides may vary with each country and may be returned by the database shown in FIG. 8, for example in field 410. The help guides may include an example of the required MIN format and a short help text in the appropriate language. Additional fields, for example, may be included in a form in which users enter the data of 84*b* for the recipient's phone number following the same format specified in 84*a* as well as the message text in field 84*c*.

Subsequent to completing processing at this point, the message 84*c* as well as the recipient's phone number 84*b* has been entered. At step 86, the message is sent to the server 24 along with the additional information input as the recipient's phone number. At step 88, the routing database 22 is consulted for the recipient's phone number. In other words, the routing is queried as to the existence or entry of the recipient's phone number within the routing database 22.

At step 90, a determination is made as to whether this number has been found within the database. If a determination is made at step 90 that the recipient's phone number is not within the routing database 22, an error message may be generated, for example, in the form of an HTML page to display the message to the user at step 106. Control returns to display the home page 74 on the user's internet device. The steps in connection with obtaining a message to be sent are started again, for example, by displaying a home page 74.

Figure 8:
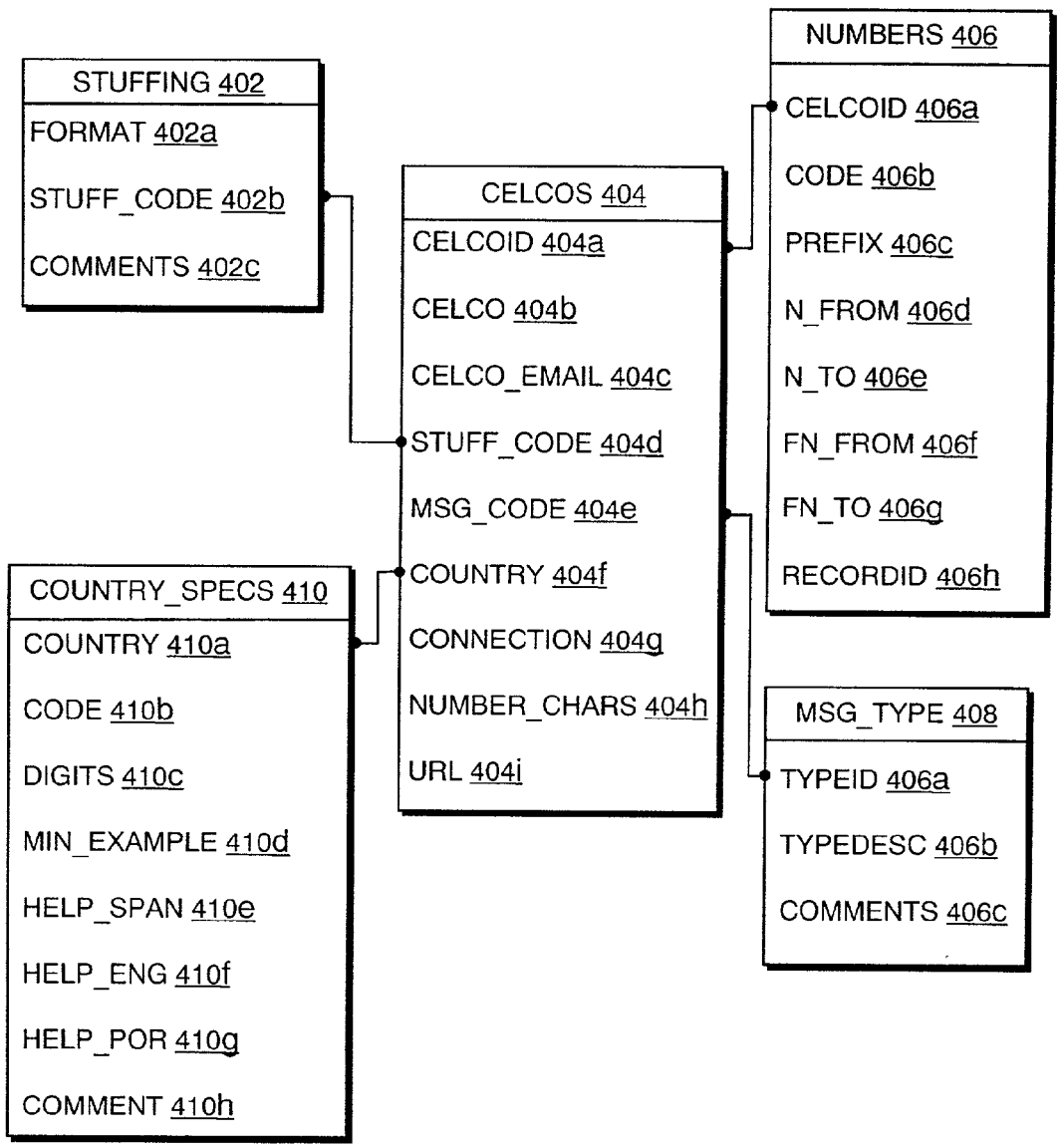
FIG. 8 is an example of a representation of one embodiment of a data organization of a central routing database.

At step 90, if it is determined that the number is within the database 22, (this information is held in sector 406 of the database shown in FIG. 8, particularly in ranges 406*f* and *g*), control proceeds to step 92 where the routing database 22 is queried regarding the required routing message method. The required routing message held in sector 404 of the database shown in FIG. 8. At step 90, if no match is found for the entered number, an error is generated 106 advising the sender that the recipient's number does not exist as in 104. At step 92, if no routing method is found 94, the sender is advised at 102 of the lack of routing path to his recipient as in 104.

At step 94, with the routing determination obtained in the previous step 92, it is known which type of message delivery formats will be utilized for the particular type of network, its protocol and the like in accordance with the recipient's information. If the routing information is known at step 94, control proceeds to step 96 where the message is placed in the appropriate format and sent in accordance with the information returned at step 92 for the particular routing technique. In other words, the data input by the user, for example, as part of the input processing at step 84, such as the message content 84*c* and the recipient's phone number 84*b* such that the message and other information may be appropriately forwarded to the indicated recipient in accordance with the routing information obtained from the database 22 in processing step 92.

The various message types and formatting are described in more detail herein elsewhere in connection with other figures. Additionally, it should be noted that other processing may be performed in connection with step 96, such as performing a mail "spamming" check or other types security and filtering of messages sent, such as the elimination of offensive text with filters and the like. Software used in connection with such functionality, for example, may be stored and executed on the server 24. The message is formatted in accordance with, in this example, different types such as the SMTP message type 108*a*, the web posting application format 108*b*, or a direct SMS connection message format 108*c*. Upon reaching this point in processing, control proceeds to step 98 where a message may be displayed upon the sender's device indicating that the message has been successfully sent.

If at step 94 a determination is made that the routing information is not known, control proceeds to step 102 where an error message may be generated and displayed on the user's device, for example, in the form of an HTML page that is processed by the browser, for example, residing on a user's personal computer. The message may indicate, for example, that the recipient's mobile network operator has not enabled messaging services. At this point, processing may return to displaying the home page 74 and beginning the processing of entering a new recipient or recipients.

It should be noted that what has been described in connection with the flowchart 70 of FIG. 2 is a process that may be generalized for sending more than one message to more than one recipient on different networks. Additionally, it should be noted that the initial query performed at step 82 may also be used during the registration process or as part of editing or adding a new mobile device. For example, the user may be required to enter a country as well as a phone number or MIN. The database may be consulted, and the correct country-wide MIN may be returned to the user to serve as a template for user entry in connection with user registration.

Users of a server based system as shown in FIG. 1 may be required to register before hand. There are some services that are offered for technical or commercial reasons that may not require registration. A registered user may be added to a database that works in the central server and routing database 22 and 24 respectively. By registering, the user allows the server knowledge of his mobile device and other such information that permits an optimization of messaging to and from the user. Another application known as an "Address Book" or "Buddy List" allows the user to add information about people who are frequently used messaging partners. Such address book would typically contain the friends phone number, associated routing path, and name. The registration process may use a collection of data, and assignation of passwords and privileges etc.

It should also be noted that the processing of FIG. 2 includes steps that may be used, for example, where an originating device has internet or browser capabilities, such as a browser phone or personal computer or other device that may transmit data in accordance with HTTP protocol in this example. Part of the processing steps of FIG. 2 may transmit data interactively, or in real-time session.

Referring now to FIG. 3, shown is a flowchart 120 of method steps of one embodiment that may be used in performing communications, for example, originating from an MO SMS phone 16 with reference to the network 10 of FIG. 1. It should be noted that the processing steps of FIG.

3 may not be performed in real time, but, rather, using an SMS data channel for message sending from the MO SMS device 16.

Processing begins with the user utilizing an MO SMS device to generate messages or to "pull" content, for example, from a web page of another server or other information/data source. The messages may be generated, for example, using input from 122a and 122b (as examples of simple messaging using SMS, as well as the example shown in 122c, to pull "content" from server 24, or any other appropriate external server connected through server 24. The input at 122a is directed to a recipient that is not in a buddy list. Generally, a buddy list refers to the concept of a list of commonly used names or recipients, for example, that may be buddies to which a sender may commonly send messages. The "buddy" recipients may be included in a short list, or buddy list rather than go through a process of consulting the database for complete information.

At step 122a, one type of SMS message may be sent to a recipient who is not in a sender's buddy list. At step 122b, an SMS message may be directed to a recipient who is in a sender's buddy list. At step 122c, a message may be sent using an SMS message, for example, to pull "content". In other words, the message includes data such as 122c that includes stock information which is to be returned in the form of a SMS message to the sender. In this example, the server may poll the host SMSC such as 26c at certain predetermined time intervals to retrieve SMS messages as may be forwarded, for example, from the MO SMS device 16. This processing may occur, for example, as part of step 124 where the sender may form the message such as 122a and forward this to the cellular operator 26c.

There are two basic methods for receiving messages from non-browser mobile devices such as MO SMS cell phones:
1. As email—Most MO SMS phones have the ability to send Email, these emails are sent as SMS to the host networks SMSC and there the full SMTP format is completed. This SMTP format may add the sender's return email as MIN@operator domain format, for example 2322332@operator.ext. In this case, the receiver of these emails may use a POP3 email server, hence is "received in email form" as indicated in step 124 of FIG. 3. The POP3 email server may be associated with the central server 24 of FIG. 1. The POP3 server may also be remote.
2. As MO SMS—If the message is written as a MO SMS, it is to a given number. This number may be a short number (assigned by the network operator for example "8200") or a normal MIN number such as "5693183098". The first case may be more common. Once sent, this message is received on the host networks SMSC. Upon reception at the SMSC, the message is placed in an outgoing spool file. In the example shown in FIG. 1, the central server 24, may poll the SMSC 26c via the dedicated connection 25b, collecting messages destined for the server 24.

The SMSC 26c may associate the server 24 by the short number as described above.

In either of the two cases described above, the message is received as a formatted text file. This is the file that is received on the server 24, and represented by step 128 of FIG. 3. In step 128 parsing logic isolates required fields from the received text files and searches for commands, such as "STOCK", seen in 122c, and "Soames", seen in step 122a. The former is a request for a stock quote, and the latter relates to a "buddy" in the user's address book called "Soames".

Using the steps described in connection with flowchart 120, a user, for example, may enter a request to "pull" data from another web site or server. The server 24 forwards the desired information, content, or application requested to the device of the requester, and/or sends a message to another enabled device.

At step 128, the SMS message is received and parsed. In particular, the sender's mobile number is extracted from the SMS message. It should be noted that prior to being received at the server 24, the SMSC may tag incoming SMS messages with the originator's or sender's phone number (MIN). Similarly, incoming e-mail messages may be tagged with the sender's return e-mail address. These fields may be used in cross-checking an existing user database, for example, that may be stored, for example, in the database 22.

The user database is linked to the routing database 22 as described elsewhere herein. Step 130 compares information included in the incoming message to that from a database. For example, user identification (usually recovered MIN number) and keywords may;; be compared to the parsed message from step 128. The keywords have a standard form, and alternate or "acceptable forms". The keywords have two forms:
1. Static Keywords: For example, in connection with 122c, the standard form of the keyword is "STOCK" but the acceptable forms may be many, for example, such as, "stock" (lower case), "share", "shareprice", "stockprice", etc. These keywords may be common to all users.
2. Dynamic Keywords: For example in connection with 122b, "Soames" is a name from a user's buddy list. The dynamic keywords are loaded each time the user is recognized as originator of the message.

At step 130, this database may be queried or consulted to determine if a particular user is registered in accordance with the MIN extracted from the SMS message at step 128. Registered and unregistered users may have varying privileges in accordance with actions that may be performed in sending messages to other recipients of this network as well as other networks. At step 132, a determination is made as to whether a sender is registered in accordance with this MIN.

As some operators choose not to disclose their user's MINs when forwarding messages, the authentication may also be performed on user "alias" names. For example, instead of forwarding the users MIN and operator extension such as 123232@operator.ext, the user may assign the user an "alias" such as tomato@operator.ext. In either case, this information is obtained during the registration process, and may be authenticated.

If a determination is made that the sender is not registered, control proceeds to step 134 where a user registration process may begin. It should be noted that subsequent to user registration at step 134, control may resume with processing, for example, at step 136 in connection with sending a message.

Upon determining that a sender is registered at step 132, control proceeds to step 136 where the previous parsing of the SMS message is again compared to a database for keywords to determine if the SMS message includes a phone number. At step 138, the web database is consulted. The user database is linked to the routing database 22 as described previously. Step 138 compares information contained in the incoming message to a database.

At step 140, if it is determined that the received SMS message does not begin with a phone number, control proceeds to step 142. At this point, the message may be an alpha numeric indicator that may be, for example, either a buddy or another keyword command. In the case of a buddy, this buddy has previously been configured in the sender's database. If the recipient is not found in the user's buddy list, control is passed to step 190. Control then proceeds to step 192 where the keyword is compared to existing commands. A keyword determination may indicate, for example, if a particular piece of data is to be polled from the server and sent to the sender or originator, for example, with regard to the stock quote, weather information, and the like.

Note that where referred to herein, "content" refers to "pre-packaged" information such as stock quotes or weather. "Application" refers to a process, for example, generation of a ring tone that is sent back to the user, or participation in a game, in both of which "processing" is required by the application upon the user's input.

If a determination is made at step 192 that the SMS message indicates or includes a keyword, control proceeds to step 194 where the content or the application is returned to the user and control proceeds to step 180 where the message is formatted and sent via the appropriate method. At step 192, if a determination is made that a first identifier in the SMS message is not a keyword, control proceeds to step 186 where a SMS error message may be generated, indicating that the command received is invalid and the message, as illustrated on output element 188, may be displayed.

If at step 182 a buddy's name is found in the user's database (see previous note on "Dynamic Keywords"), the routing path for that buddy is returned and the message is sent 184 to the recipient. As previously described in connection with FIG. 2, steps 196a, 196b and 196c may result in reformatting of a message in accordance with the appropriate format and type for the recipient's network and connection. These are similar to what is described in connection with the processing of steps 108a, 108b and 108c of FIG. 2 and as described elsewhere in connection with FIG. 2.

At step 140, if a determination is made that the SMS message begins with a phone number, control proceeds to step 144, where the SMS message that is received by the server is parsed to extract the recipient's country code. At step 146, this recipient country code is used to look up in the routing database 22 a corresponding country for the country code extracted at step 144. The country codes (prefixes) and numbers may exist in sector 406 of the database shown in FIG. 8. At step 148, a determination is made as to whether the country has been located from the routing database. If a determination is made that the country has not been located, control proceeds to step 150 where an error message is generated and the message is returned to the sender at step 154. As an alternative process, (not shown) logic may be such that in the case of not finding a country code, the recipient is deemed to be in the same country as the sender, in which case the senders country code may be added to the recipients number. More detail of the number lookup process is shown in a detailed flowchart FIG. 4.

If the country is located and determined at step 148 to be included within the routing database 22, control proceeds to step 168, where the SMS message is parsed to extract the recipient's phone number. The routing database 22 may be queried to look up the recipient's phone number. A determination is made at step 172 as to whether the MIN or phone number is located within the routing database. The country codes (prefixes) and MIN numbers may be included in sector 406 of the database shown in FIG. 8. At step 172, if the number is not located within the routing database, control proceeds to step 156, where an error message is generated and control proceeds to step 154, where the SMS message is returned to the sender.

At step 172, if the number is located in the routing database, control proceeds to step 174 where the database is queried for the required routing method in accordance with the recipient's phone number, country code and, accordingly, the appropriate routing techniques used in accordance with the protocol, hardware and the like for the recipient's particular network. At step 176, a determination is made as to whether the routing information is known. If the routing information is known, control proceeds to step 178, where the SMS message is parsed, the message text is extracted from the message and control proceeds to step 178, where the message is formatted and sent via the appropriate method as indicated in accordance with the information from the routing database. Control proceeds to step 164, where an SMS report may be generated, the message may be sent at step 166, and control proceeds to step 154 where a message is returned to the sender indicating the actions taken.

At step 176, if a determination is made that the routing information is not known, an error message may be generated such as indicated at output 162 that the recipient's network operator has not enabled messaging services. Subsequently, from the processing at step 160 that may result, for example, in a display of a message as indicated at 162, control proceeds to step 154 where the SMS message is returned to the sender. As previously described in connection with FIG. 2, steps 196a, 196b and 196c may result in reformatting the message in accordance with the appropriate format and type for the recipient's network and connection. Please note that these are similar to what is described in connection with the processing of steps 108a, 108b and 108c of FIG. 2 and will be described in more detail in paragraphs that follow in connection with other figures.

The processing steps described in connection with flowchart 120 of FIG. 3 are those that may be performed in connection with data polling to obtain information, such as a stock quite, or sending a message to another enabled device where the originating device, for example, may be an MO SMS phone, such as element 16 of FIG. 1. Previously described in connection with FIG. 2, are processing steps that may be associated, for example, with sending an SMS message originating from a personal computer or from a WAP phone as shown with reference to the network 10 of FIG. 1 from elements 12 and/or 14. Using any one or more of elements 12, 14, and 16 of FIG. 1 as points of origination, an SMS message may be sent, for example, to user 20 using the SMS phone through the routing database 22. The database 22 may be queried in accordance with software executing on the server 24 as indicated in connection with various processing steps just described herein.

It should be noted that, with reference to processing steps of flowchart 120, if the SMS message does not start with a number, for example, such as a phone number possibly preceded by a "+" sign with at least eight digits, then the first "word" in a message body may be examined in accordance with a user's buddy list. If the first word is determined as identifying a buddy, the processing of flowchart 120 directly sends this message to the buddy or buddies and the messaging format is already known as they are within the same network. If a determination is made in connection with the processing of step 192 that an incoming SMS message includes a keyword, keywords may be used in an embodiment to abbreviate common commands. For example, as previously described in requesting a stock quote, the user may start an SMS message with the word "STOCK" followed by a ticker name or other type of stock indicator. In this instance, the required information may be retrieved from the server or other servers and returned directly to the sender of the message. Additionally, features within different embodiments may allow the sender to further forward the content or applications to others. For example, a command known in one embodiment as the "RING" command, followed by a phone number, followed by a group indicator may forward one or more RINGING audible tones from a specific group of tones to a particular phone number indicating a recipient.

In general, from the above description, and the logic of FIG. 3, it may be seen that certain services, that are those that are thought to have higher volume of use, may be given higher priority in the logical process sequence. The presented priority is one example, and may change as user needs change. The presented priority is:

1. Messaging to a phone number
2. Messaging to a pre-configured "buddy
3. Messages requesting and application or content It should be noted that in processing an SMS message, if the SMS message is preceded with a number, for example, that may indicate a MIN or phone number, that MIN or phone number is parsed and checked in the number routing database 22. This MIN or phone number may include, for example, a country code. Some countries, such as the United States, may have only a single digit, such as a "1," to indicate the country code. The parsing and checking processing of the phone number may be performed for each single digit until a unique match for a country code is found.

For example, if a message recipient's phone number is indicated by the string "+5693183098", the 5 at beginning of the string may first be checked in determining the country code. As a result of querying the database, there may be an indication that there are multiple country codes beginning with a leading digit of "5". Thus, a single country is not unique for the digit five. A subsequent second look-up may be done upon the same string returning a "6" as a second digit. Thus, a database query may be performed using five six "56" as the country code. Upon a single country being returned as result of a database query, the "56" indicates a unique combination of two digits corresponding to a country. For example, in one embodiment, performing a query of routing database for the one or more countries having a country code with first two digits of "56" returns the single country of Chile. The return of only a single country being associated with the two digits causes the country-code look-up process to terminate. If no country is found, an error may be generated for example in connection with the termination processing at step 148 and the error message 152 displayed in connection with the processing of step 150 with reference to flowchart 120 in FIG. 3.

It should be noted that the foregoing search for a unique combination of one or more leading digits of a country code may iteratively be performed examining each next digit until a unique country is associated with the number of digits, or no such country has been determined to include those as leading country code digits.

Once a valid country code has been identified the remainder of the recipient's phone number may be examined. An additional query may be performed in the routing database to look up the remaining portion of the phone number only in the predetermined country, for example, such as Chile in accordance with the country code just examined. If this phone number of a recipient is not located within the country corresponding to the country code, an error message may be generated. This is an example of processing that may be performed in connection with step 170 and the determination made at step 172 in which the database may be queried for a particular phone number in accordance with a particular country code. Accordingly, an error message at step 156 may be generated if the particular phone number is not in existence in the database where the predetermined country as entered by the country code.

Referring now to FIG. 4, shown is a flowchart 200 of steps of one embodiment for performing a look-up in the routing database 22. The steps in flowchart 200 may be performed, for example, in connection with consulting or querying a routing database to return particular information. Generally, the processing described in the flowchart 200 of FIG. 4 details database querying steps, for example, as previously described in connection with flowcharts 120 and 70.

A recipient's phone number and message for example may be entered using any one or more of a variety of different types of devices. Input may be received 202 using the internet or WAP device as well as from an MO SMS phone 206. In both instances, data input may indicate a message, and a recipient's phone number as indicated in input 204. Control proceeds to step 208 where the first most significant digit is parsed or selected from the string identified as the recipient's phone number in the message. Beginning with step 208 processing, a determination is made as to the particular country code indicated in the recipient's phone number. In step 210, the routing database 22 is queried to return a list of countries having the first most significant digit as parsed at step 208. In this example, "1" may be the most significant digit in accordance with the sample input at step 204. If no country codes are determined at step 212 to include a "1" as the leading and most significant digit, an error message may be returned as part of the processing at step 214.

Otherwise, if there is a "1" that is the most significant digit in one or more country codes as indicated in the routing database, countrol proceeds to step 216 where a determination is further made as to whether there is only a single instance of a country code having a most significant digit of "1". If there is a determination made that there is more than a single instance of a country code having a most significant digit of one at step 216, control proceeds to step 236 where a combination of the current first most significant digit followed by the second most significant digit is extracted or parsed from the phone number and the database is then consulted at step 238. The foregoing general processing of determining if there is a unique country code having the current set of significant parsed or extracted digits is repeated at step 240 where a determination is made as to whether there are any country codes having the combination of the first and second most significant digits.

An error message is returned at step 242 if a determination is made at step 240 that there are no such country codes valid in accordance with the routing database. Otherwise, control proceeds to step 246 where a determination is made as to whether there is only one instance of a particular country code indicated by the processing of the combination of the first and second most significant digits. This process may be generalized and repeated for a combination of significant digits until only a single country code is found and matched to a particular combination of most significant digits from the phone number.

Upon finding a unique country code for a combination of one or more significant digits in the recipient's phone number, control proceeds to step 218 where the corresponding country code is returned. Subsequently, the remaining portion of the recipient's phone number is looked up in the routing database 220. In other words, a query of the routing database may be performed to determine if, for the particular unique country code, is the individual recipients' phone number included in the routing database.

Upon reaching processing at step 222, a unique country code is determined and a the routing database has been queried as to the existence of the recipient's phone number in the country indicated by the unique country code.

Associated with step 224 is yet another technique that may be used in determining a country code. Other processing steps described herein in connection with flowchart 200 extract a country code and determine a unique country code from input in accordance with a parsing technique using a unique combination of leading digits as recorded in the routine database. At step 224, a country code may also be selected, for example, from a pull-down menu causing the associated country code to be an input to the system in accordance with a menu selection.

In either of the two cases, at step 220, the now known country code is ignored and the MIN number ranges for that defined country are queried in accordance with the recipient's number's ("MIN look up"). For example, if the country code was found to be "one" either by the iterative process, or by direct user selection, the MIN lookup is performed only within the USA portion of the database. The lookup is performed in step 222.

If a determination is made at step 222 that the recipient's phone number is not within the range valid for the particular country code, control proceeds to step 226 where an error message is generated indicating that the recipient's phone number is not in the system.

If a determination is made at step 222 that the recipient's phone number is within the range of valid phone numbers returned at step 220, control proceeds to step 228 where a query or a determination is made as to a particular messaging format being defined for the returned mobile network operator and the message code. In other words, a determination is made in step 228 whether the format is defined or known for the particular network supporting the user or recipient having the phone number entered at step 202 or 206.

If a determination is made at step 228 that the recipient's MIN or cellular phone number is known, but no messaging format is defined for the particular phone number and associated digital mobile network for messaging, an error message is returned at step 230 indicating that the recipient's mobile network operator has not enabled messaging services. Otherwise, if the messaging format is defined for the particular mobile network operator at step 228, control proceeds to step 232 where the messaging type is returned from the database. Control proceeds to step 234 where the message text address and the like are formatted in accordance with "message code" and "stuff code" fields returned from the database.

It should be noted that particular error messages and the particular fields included in a database indicating the appropriate messaging formats may vary in accordance with each embodiment. A representation of how data may be organized and stored in one embodiment of the routing database is described elsewhere herein. A variety of different data organizations and hierarchical representations of data may be included in an embodiment. Generally, the routing database includes information indicating the different protocol and hardware information for appropriately formatting an incoming message for the one or more recipients in one or more corresponding digital mobile networks.

Figure 5:
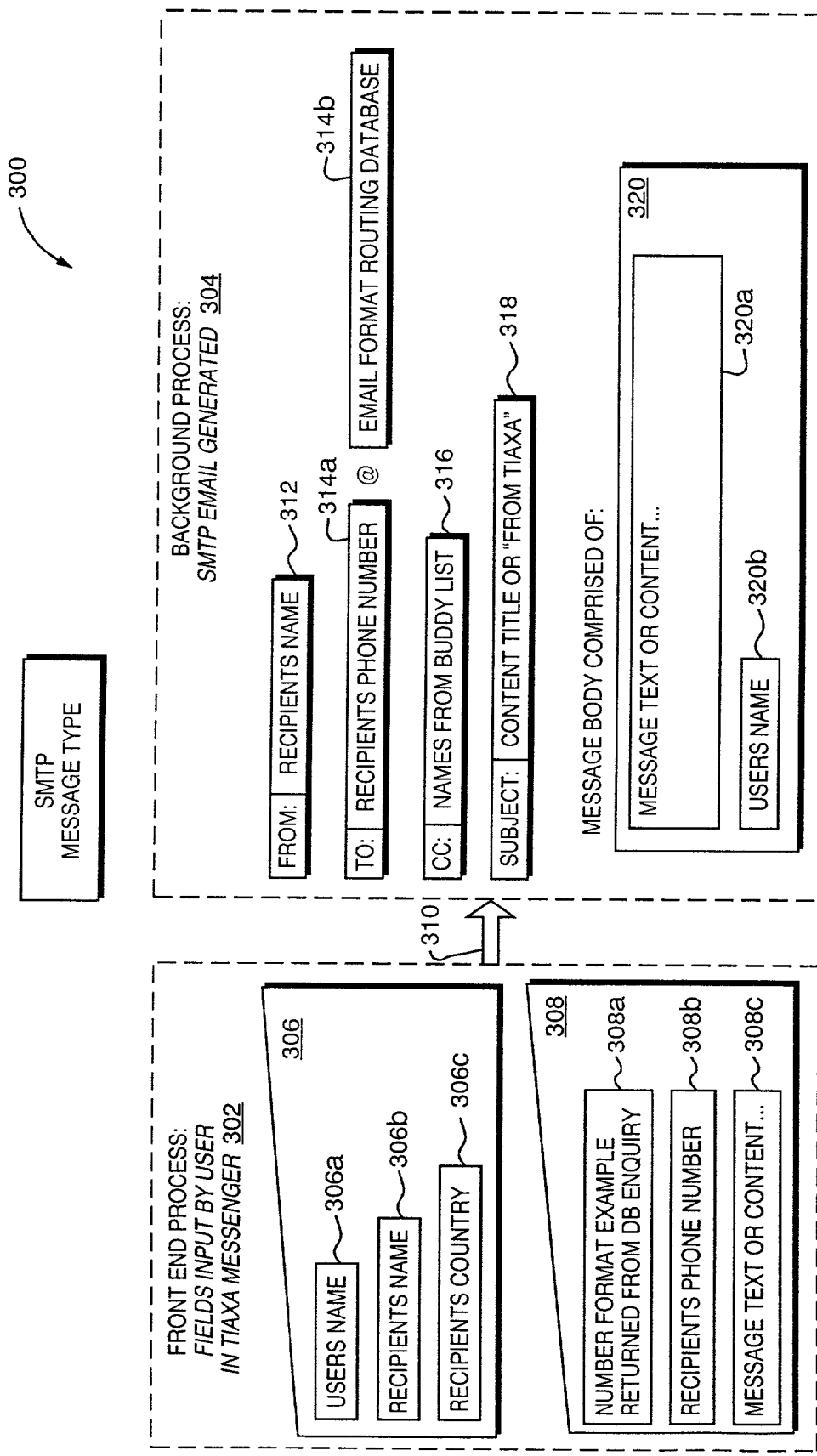
FIG. 5 is a representation of a mapping that may be performed in sending an SMS message using SMPT e-mail.

Referring now to FIG. 5, shown is an example of a representation of a reformatting or a translation process that may be used in sending an SMS message via SMTP email. In other words, as shown in the representation of the mapping 300, a message format 302 is mapped as indicated by arrow 310 to a new format for message 304. The text fields input to the messenger's front-end view via a browser are translated or mapped into an SMT TP email format in the background processes described below. The term "background process" refers to a common application, not forming part of this patent claim, typically following an already well-known and used standard. In this case SMTP is the standard formatting method used for outgoing email messages.

It should be noted that the data input in accordance with the format described 302 may be input, for example, from an interface via a web page. It should also be noted that the SMTP format is one example of an email message format in accordance with an email protocol. Different protocol may vary in accordance with SMSC manufacturers as described elsewhere herein.

The recipient's country code is data input in field 306c may be pre-selected from a pull-down list, for example, from a graphical user interface display. Additionally, the recipient's name may be entered in a field through a form interface 306b as well as the particular user's name. The user's name 306a may indicate the sender of the message entered. As described elsewhere herein, in accordance with the recipient's country code 306c, a sample, or template of a formatted phone number may be returned from the database and displayed in a field 308a. Accordingly, a user sending a message may input in a field 308b the recipient's MIN or phone number in addition to the message text respectively in fields 308b 308c.

The routing database 22 may be queried using as an input the recipient's phone number or MIN 308b to return the corresponding mobile network operator and associated routing information for the particular MIN. Routing information may include, for example, a particular protocol, hardware and/or software information regarding how a message is routed, reformatted, and the like for use in a receiving digital mobile network. In this example shown in the representation 300, the database query when the input is the recipient's phone number 308b indicates that the forwarding method for that particular carrier network is via SMTP email. For example, the MIN or phone number "305-588-2909" may select AT&T as the carrier for a country code of "1" indicating the United States. Additionally, the returned SMTP address may indicate a format of "mobile.att.net".

The recipient's MIN or number 308b is then transformed from a countrywide MIN format into that particular format of the mobile network operator. For example, digits may be added or padded or removed from a phone number in order to comply with the mobile network operator messaging MIN or phone number format. For example, a user may input a countrywide format indicated of "3055882909" as returned as the user help file for the USA, for example, as included in FIG. 8 sectors 410d (with text in 410e, f or g depending on the users chosen language). The routing database of FIG. 8 returns the exact mobile network operator corresponding to that MIN, and therefore returns the required formatting information. Specifically, the MIN is sought between the ranges 406f and 406g, and the formatting information is returned for the located operator 406a in 402b and 408a. For example, what is returned may indicate that the uniform countrywide MIN format input may require further tailoring or modifications to transform this into the proper format to be used in accordance with the AT&T carrier network using the SMTP email protocol. The routing database may indicate that carrier AT&T requires a fixed 11 digit number format and since this is the United States, the country code or leading digit of "1" may be inserted, i.e., "13055882909", as may be returned by 402*b*. The component of the recipient's phone number 314*a* which is the reformatted version of 308*b* is "13055882909" with the @ and the email format for the particular carrier 314*b* from the routing database, from 404*c*. In this instance, for example the complete email address formed by combining fields 314*a,* 314*b* and the @t sign may indicate an email address of: 13055882909@mobile.att.net.

What will now be described are other types of formatting represented in the FIG. 300. The user's name 306*a* may be placed in a corresponding field in the SMTP email 304 in field 320*b*. The recipient's name 306*b* may be in the destination field 312. Similarly, the subject field 318 maybe some fixed format such as "from Tiaxa" or some specified title or application name as indicated in field 318. The message text 308*c* occupies field 320*a* of the reformatted message 304.

Optional processing may also be performed, for example, to scan the email or body of the text filtering out predetermined offensive text and the like. Accordingly, the message may be sent and received by the network operator's SMTP gateway such as 42*a*, referring back to the network system 60 of FIG. 1A. In this instance, the recipient may be user 50*a*. The SMS messages received as just described by the SMTP gateway, may be translated, and passed to the SMSC to the recipient. The recipient receives the message on the mobile device and accordingly may be processed by reading the message, saving it, deleting it or replying to it in accordance with the device and network type.

Figure 6:
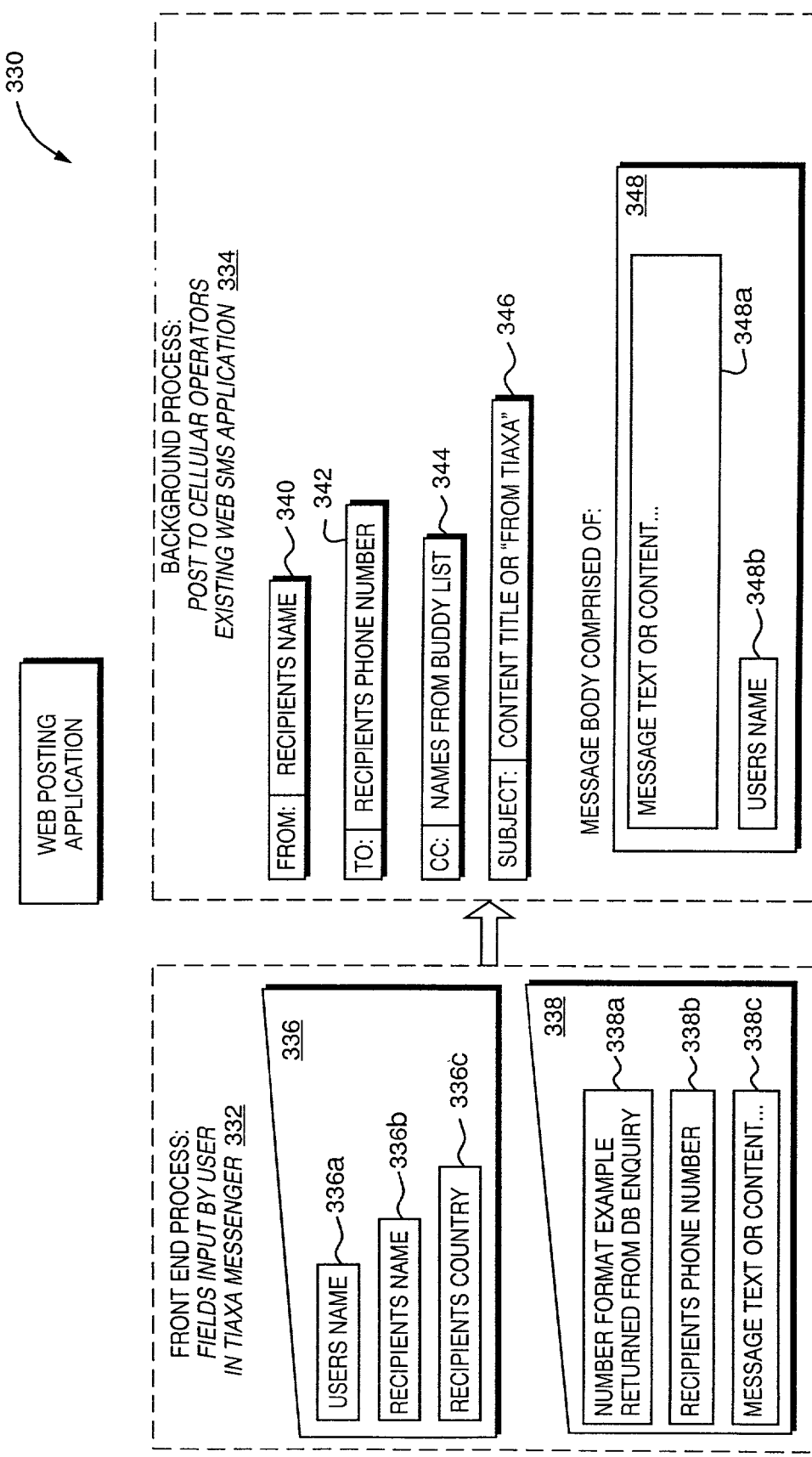
FIG. 6 is a representation of an example of sending an SMS message using existing web SMS applications and the mapping performed.

Referring now to FIG. 6, shown is an example of a representation of a mapping process that may be performed for a sent SMS message, for example, input from a user interface via the internet to a recipient on a network that uses existing Web SMS applications.

In connection with the method illustrated in FIG. 6, the server 24 writes to the target mobile operators web based SMS interface. The connection from the server 24 to the Web based interface may be a standard Internet, using http over an IP network. The sender of the message, in connecting two the server 24 can use any of the methods and devices shown on FIG. 1, users 12, 14 and 16.

Figure 7:
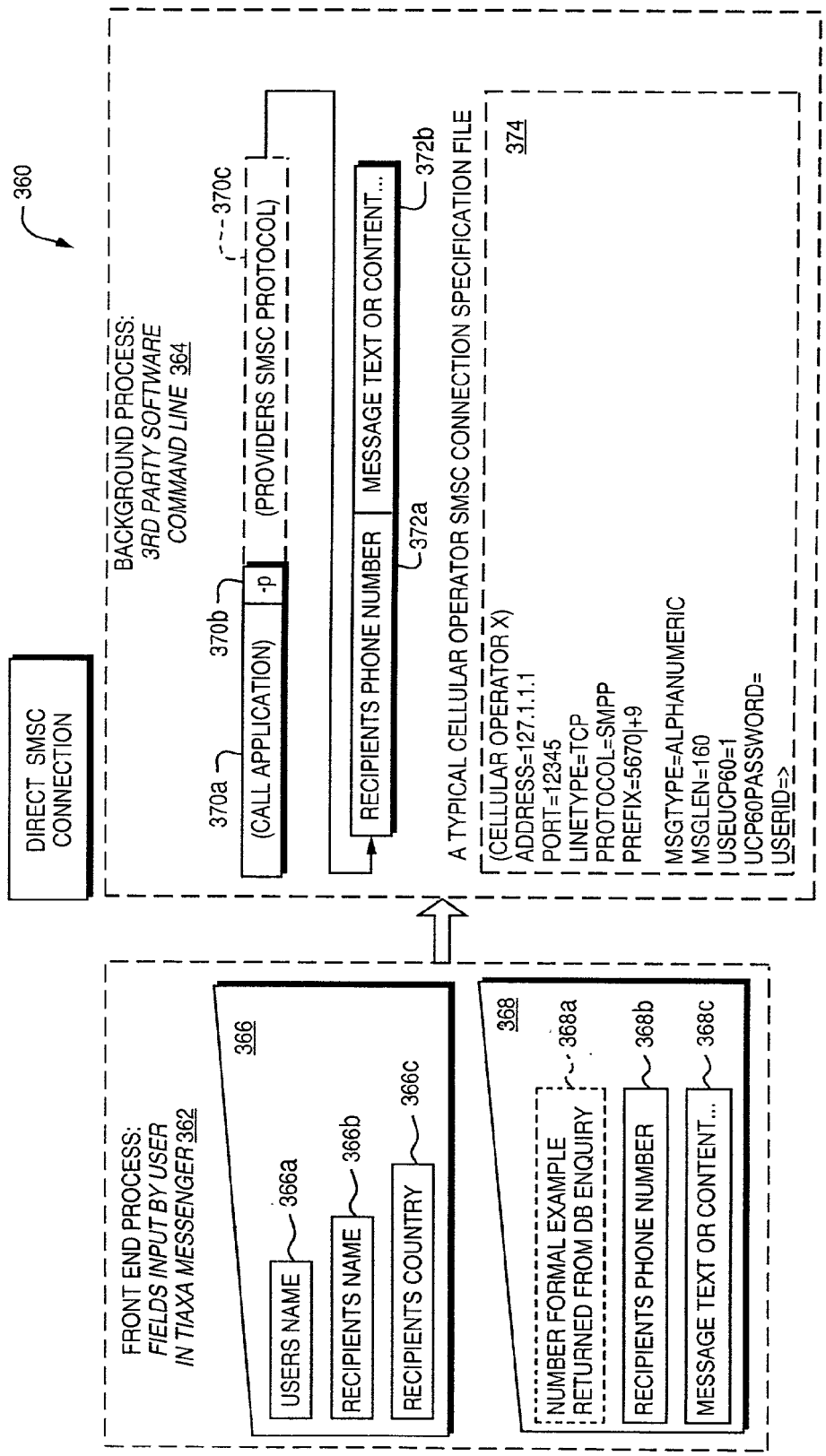
FIG. 7 is a representation of an example of sending an SMS message via direct data connection to an SMSC which an SMSC is a mobile network operator for example.

It should be noted that in connection with all three messaging scenarios of FIGS. 5, 6 and 7, the server 24 is the message broker. The incoming and outgoing messaging types may differ or the same, as the message sending of each mobile system is linked using the database by the server.

It should be noted that field 332 data is similar to that as described in connection with element 302 of FIG. 5. In this instance however, the data included in the field 332 is mapped or translated to a format 334 to provide for the forwarding of SMS messages via existing Web SMS applications as per 42*b* of FIG. 1A.

What will now be described are generally how fields indicated in 332 are mapped or translated into those indicated in 334. The recipient's country 336*c* as previously described may be a country code selected from a pull-down list that may be displayed from a pull-down menu on a graphical user interface from a web page. The recipient's MIN or phone number 338*b* may be used in performing a query or search of the database to return the appropriate mobile network operator and return a URL for the Web SMS location. For example, a URL may be returned indicating the address of a particular HTML page that indicates or hosts the particular application.

This application may be connected to the mobile network operators SMSC and forwards messages to users on that particular operators network. For example, the IP address or URL returns the messaging application web site of operator "x". The application on that site may require that the recipient's MIN number is entered, along with the message. A "send" button may then be used to submit the message. The operator's background application takes this message, and transforms it to an SMS message that may be processed by the operator's SMSC. From thereon, the message is forwarded to the recipient's handset as a conventional SMS. The Tiaxa process emulates this process from the central server 24, in this way, forwarding the message on from the sender.

As a further example, the phone number "30572111234" may correspond to a mobile network operator or carrier having a corresponding URL, or an IP address. Part of the processing as previously described is transforming the recipient's MIN or phone number 338 into the particular mobile network operator's format, for example, using padding or stripping leading zeros or the portions of the numbers as needed. Many network operators having web based messaging systems use local short form numbering as the users are generally local. In this case, international form numbers have the country code removed. For example, a user may input a MIN format that may be 10 or 11 digits long. The routing database may indicate for a particular mobile network operator or carrier, only the last seven digits of the MIN may be used when sending a message to a user associated with that particular mobile network operator. Therefore the number representative of the recipient's phone number 338*b* when remapped or placed in a format 342 may include only the last seven digits of the MIN. The MIN in the fields described herein may be posted via HTTP to the fields or commands on the mobile network operator's existing web based SMS application.

Similarly as described in connection with the processing of the translation or mapping of FIG. 5, corresponding portions of the field are mapped or translated from 332 to that of 334. Additional optional processing may be performed for example to eliminate offensive text as also previously described. Once the message is placed in the format 334, the message may be sent and is received by the mobile network operator's web SMS application, translated, and passed via the SMSC to the recipients of the message. In other words, the web posting application mapping technique represented in illustration 330 described in connection with FIG. 6 may be used when a recipient's message is in a digital mobile network that uses a Web SMS application to translate messages received.

FIG. 1 takes the user perspective of "all connected" messaging. Note that as described elsewhere herein with all three messaging scenarios, the server 24 is the message broker. The incoming and outgoing messaging types could be different or the same, they are independent of one another, and logically linked only via the database. FIG. 1A shows the possible "output" forms, that is, from server 24 out to the recipient.

Referring now to FIG. 7, shown is a representation 360 of mapping input field 362 to a format 364 used in connection with a direct connection to an SMSC. It should generally be noted that the fields of 362 of FIG. 7 are similar to those described in connection with field 302 of FIG. 5 and 332 of FIG. 6. In other words, these fields may be input, for example, using a form-like interface such in connection with a Web page, or alternatively received as a MO SMS as in connecting with user 16 of FIG. 1. The incoming and outgoing messaging types may be different or the same, as they are independent of one another, and logically linked via the database and server at the "hub" of FIG. 1.

Subsequently, these data fields input may be mapped to the format 364 in accordance with a particular format as indicated by the country code, MIN, and particular cellular carrier or operator with information as recorded in the routing database to produce the format 364.

The recipient's country code may be preselected such as included in field 366*c*, for example, such as in connection with a pull-down user interface menu. A country-wide format form may accordingly be displayed in field 368*a* (output field) as a template to serve as an example for entering the recipient's phone number or MIN number 368*b* (input field in accordance with 368*a* format). Additionally, the message text or content may be entered in field 368*c*. This is similar to other descriptions included elsewhere herein in connection with other figures.

Also as previously described, the routing database may be queried in accordance with the recipient's MIN or phone number as indicated in field 368*b*. Accordingly, routing information may be returned from the database in accordance with this particular MIN for particular countries selected. In this example, the forwarding method returned from the database may indicate integrated third-party application software. For example, the MIN or phone number "6912371234" may select cellular operation or carrier "Z" as a carrier and return an instruction to call the SMSC direct forwarding application.

The direct forwarding application may use as an input a unique configuration file for each different mobile network operator in which the specifications may vary in accordance with each cellular carrier or mobile network operator. In other words, a configuration or specification file 374 may be created with certain information as indicated in this particular example that may vary with each cellular carrier, operator and/or network. In this example, specifications included in the configuration file 374 may include the IP address of the SMSC of the recipient (127.1.1.1), the user name assigned by a mobile network operator for the connection on SMSC, a password, a protocol type of SMSC for example such as SMPP, a message type, and a message link. Similarly as described in connection with other figures the recipient's phone number or MIN may be transformed from the country-wide MIN format into a mobile network operator-dependent format that may include, for example, truncating or padding digits as needed.

In this example, cellular operation "Z" may use the standard 10-digit MIN resulting in no change to the MIN in the output formatted message. Thus, the number as indicated in field 368*b* may be copied directly to field 372*a* without alterations. Other fields may also be copied and mapped as indicated in 360 FIG. 7. The message in turn may be received by the mobile network operator and forwarded accordingly to the recipient. As the connection is direct to the SMSC, the message is not converted on reception by the SMSC. Rather, it may be forwarded directly to the recipient's handset. Advantages exist in this type of connection, for example, in that it is known if the message is received successfully on the handset. The whole process is logged step by step, and these logs in turn may be filtered and modified to form billing information.

Referring now to FIG. 8, shown is an example of a representation of one embodiment of a routing database that may be used in connection with the processing for the routing database 22 described herein. The schema 400 includes tables representing data that may be included in one embodiment of the routing database as well as relationships between those tables. However, it should not be construed as a limitation as other embodiments may include additional information as well as additional types of mapping and relationships.

The representation 400 includes a stuffing table 402, a Celcos table 404, a numbers table 406, a Message Type (Msg_jype) table 408, and a Country_Specs table 410. In one embodiment, each of these tables may represent of format of information of a record.

For example, a record may exist in the routing database for each mobile network operator and include the information specified within the table 404 as fields of the record associated. Information may be stored in accordance with each particular "Celco" or mobile network operator such as AT&T, Verizon, Voice Stream, and the like. A unique ID or CelcosID 404*a* may be stored for each mobile network operator as well as the name of Celco in field 404*b*. An e-mail address may be included in field 404*c* that follows the "@" sign when forming an e-mail address, or is indicated as "unknown" for incompatible celcos. Some network operators do not have messaging services available on their networks, for example, those operators using analogue mobile phones of the AMPS standard. These operators do however have MIN listings, and the system, server 24 and database 22, understand that although a MIN exists, it does not automatically imply the MIN, and therefore the associated mobile device, may necessarily receive an SMS message.

The celco e-mail field 404*c* may include, for example, the information included in field 314*b* as previously described in connection with FIG. 5. This may generally be thought of as the operators email extension. The Stuff code_404*d* and the message code 404*e* are fields in one embodiment that include information about the exact formatting of the message required for the returned mobile network operator. The Country field 406*f* relates the mobile network operator to a geographical location or country. This may be later used to provide operator and language specific help to the users. The help feature is described elsewhere herein in more detail.

The Connection field 404*g* describes the connectivity method used to connect from the central server 24, to the cellular operator. The different method of connections, as described elsewhere herein, may include:

1. Direct connection via SMPP, UCP, OIS or similar
 2. Email connection to the operators email gateway
 3. Posting application to the operators Web SMS gateway For example, the Motorola SMSC manufacturer as described elsewhere herein may support any one of three different types of protocols such as SMPP, SMTP for e-mail, and HTTP. The medium for transport may be one of, for example, modem, ISDM, X.25, X.31 or TCPIP. Information as to which protocol and transport medium as well as the particular SMSC manufacturer used by a particular celco is indicated elsewhere herein.

The Number_chars field 404*h* is used to return the maximum SMS message length supported by the destination mobile network operator. This is typically in the range of 90 to 160 characters, with some as long as 500 characters. Information given here is used by the process logic to determine if it is necessary to split and send as a series of concatenated SMS messages, or indeed to join split messages into one SMS message. For example, in the scenario shown in FIG. 1, if user 16 has a messaging length 404*h* of 160 characters, but the recipient 20 has 120 character messages, the message may be broken down and divided in the server 24 into multiple messages such as two messages, of the format 1 of 2 and 2 of 2. These multiple messages may be sent to ensure arrival in the correct sequential order.

The URL field in 404*i* holds the URL or web link of the mobile network operator 404*b*. This link can be used to point the user to the correct source for local help, for example, to request that the operator enables SMS or other messaging privileges. T his information may be displayed in a variety of circumstances, for example, on detecting an error in the forwarding of a message. An example of the table 404 formats may be seen in FIG. 9.

The country specs table 410 may describe information regarding the country-wide MIN format, for example, used as a template in entering the recipient's phone number 308*b*. From a user point of view, a single numbering convention may be preferred and shown for all mobile network operators in that country. This may avoid user confusion. The country specs table 410 in this example includes: a country 410*a* which may be indicated as an alphanumeric or other type of abbreviation for each country, a code 410*b* which may correspond to a country code from a pull-down list, digits 410*c* indicating the number of digits that may occur in a phone number in the country-wide MIN format (this may be used as a checksum to compare quickly to the user input number, (e.g. Is the number the correct length?), an example phone number 410*d* which may be displayed, for example, in field 308*a*, and any additional comments 410*e, f* and *g* that may be displayed in accordance with this particular field. The comments are in the appropriate language for the user, if the user is unknown the default is the countries language. A comment field 410*h* allows any other pertinent information to be entered. An example of table 410 format can be seen in FIG. 10.

The message type table 408 is used to format the outgoing (from server 24) message. As most messaging scenarios are basically the same, with small variations some message types can therefore be re-used on many different mobile network operators. The TypeID 408*a* assigns a number to each of the used formats. The field TypeDesc 408*b* describes in detail the type of message formatting operations performed by the application. Here are some examples of 408*b*:

Put [Message] In The Email Subject—in this case the text enclosed as the message body is formatted to enter the subject field of the target mobile network operators SMS application.

Put [StuffedNumber [Message]] in Email Subject—in this case the Stuffed number (see 402 later) is placed alongside the message body within the email subject field.

A comment field 408*c* allows any other pertinent information to be entered.

Further examples of table 408 can be seen in FIG. 11.

The Numbers Table 406 indicates that MIN or phone number ranges for each particular celco Id. This table is critical as it performs the initial lookup of the target mobile network operator, taking as its input an unknown MIN. The celco ID 406*a* is that particular field for example identified in field 404*a* used as a reference to index into the numbers Table 406, this field is a short alphanumeric label that uniquely identifies all operators. The international country code 406*b* is included, and is used in cases where the incoming MIN number has had the country code isolated from the rest of the number, this permits faster lookup as only the number in that country are scanned. See step 220 in FIG. 4 for an example of its use. An area code or cellular number prefix is included in the field 406*c*, some countries assign a unique code or access number to indicate that the recipient is a mobile device, others use normal area codes as for traditional telephony. Fields 406*d* and 406*e* identify ranges of phone numbers allocated by each particular operator. These numbers are the local form only, as they are without country code and prefix. This form may be used in some messaging systems using only local form MIN. Similarly, the fields 406*f* and 406*g* identify MIN or phone number allocation ranges that include the prefix identified in field 406*c* and country code as in field 406*b*. These number ranges are those generally consulted in the mobile network operator lookup process. As the numbers are in complete international form, they can may only one unique device associated worldwide, guaranteeing that the mobile network operator returned is the correct one. Record ID field 406*h* is a unique identifier for each line of the database, this is needed for correct database operation and processing.

As an example of usage, if the sender 16 of FIG. 1 wishes to send a message or application to the recipient 20, the following lookup occurs:

The sender 20 sends a message to the recipient 16, the sender specifies the recipients MIN as 5693183098, types his message and sends it to the server 24. At the server 24 the sender 20 is first authorized by comparing his MIN to the user database, if he is registered the recipients 20 number is looked up or scanned for in the ranges 406*f* to 406*g*. If the number is found, the corresponding mobile network operator is returned using the CelcoID 406*a*. The sender's message is then processed in the server 24 according to the rules in the database for the returned celco ID 406*a*, in particular regarding to formatting and sending method. Once reformatted, the message is sent out to recipient 20.

Further examples of table 406 can be seen in FIG. 12.

The stuffing table 402 is used to format the outgoing (from server 24) message. As most messaging scenarios are basically the same, with small variations some message types can therefore be re-used on many different mobile network operators. The Format 402*a* assigns a number to each of the used formats and is basically a list pointer. The field Stuff_code 402*b* describes in detail the of required MIN formatting operations performed by the application. Here are some examples or 402*b*:

(stuffed "0")(prefix)(stuffed "15")(number)@email—here the user input recipient MIN has a number 0 added, has the prefix 406*c* added, has the number 15 added and then ends with the local form number. For example, if the sender 12 were to send a message to an recipient 20, who corresponded to mobile network operator with this Stuff code, the input number may be: 234422 and the output number, after being modified in the server 24 application would be 05515234422. This would therefore be forwarded in this form to the recipient 20 mobile operators network.

A comment field 402*c* allows any other pertinent information to be entered.

An example of the contents of table 402 can be seen in FIG. 13.

Here is an example of use of all the previously described fields in the routing database 24:

A user may send a message to the number 5733321588. He prepares the message with the recipient's number located in either the message body, or in the "to" field of the MO SMS device and "sends" the message that is received on the mobile network operator's SMSC and then forwarded to the server 24. The incoming message is parsed and authenticated and the routing database is consulted for the recipient's number, specifically in the ranges 406*f* and 406*g*. In this case, the number range is found to be associated to a Colombian operator called "operator B". In FIG. 8, sector 406a, "operator B's unique ID is then returned. The ID 406a associates the information in tables 404, and it's dependants 402 and 408. The ID returns the rules for formatting and processing the message. For example 404d points to lookup table 402.

In table 408 the message format type 408a is found, the message formatted accordingly in the correct fields. For example: the name of the sender is placed in the subject field of the outgoing message. In one example, "operator B" is accepted and, therefore the message is left in the message body.

The stuff code, 402b, adds or removes digits from the MIN to suit the operators numbering convention; some use international formats (like GSM operators, a typical number being +5693183098), and some use local format numbers (typical in TDMA operators, a typical number being 3183098). For example, when sending a message to a TDMA operator's SMSC, if the incoming number is in international format, the international country code may be removed before sending to the SMSC. If it is not removed, the SMSC may not recognize the recipient and not deliver the message, or think that there is an error. In this example, the "operator B" is TDMA, but the ID reveals the operator to be TDMA. The stuff code, 402b, indicates that the first two digits are removed. The number 5733321588 then becomes 33321588.

At this point, the message is formatted. It is determined How to send the message to "operator B". The ID relates to table 404, and field 404g is checked. In this case "SMPP app 2" is found forcing a DIRECT connection with the operator's SMSC. That loads the correct configuration file to the server 24. Fields and parameters are combined to form the message output. Finally, a check to determine if the incoming message is of the correct length to fit in to one outgoing message is performed with the information returned from 404h, number of character field. As the message is short in this example, it fits easily into one outgoing message.

To complete the above example, if the message to be sent is "how are you", the following may be spooled to the SMTP application for forwarding to the target mobile network operator:

Sending application name—operator B—33321588—how are you

The application starts, calling those details required for operator B, such as IP address, user name and password, and once connected to the remote SMSC, will submit the message as shown.

Additionally, techniques described herein may be used in facilitating communication via SMS between source and destination devices each using different underlying technology. For example, one cellular telephone may be a micro browser telephone using software providing for WWW connections and functionality associated therewith. This type of device may communicate, for example, with older devices.

The foregoing also provides a simplified mobile operator network number input format with examples, each of which is unique for country, in an effort to reduce user input error via the simplified format. The foregoing also includes a database having flexible construction to permit incorporation, for example, of new mobile network operators, and updating information and message delivery methods as needed. The foregoing techniques are included in a flexible system that may be used for any one of variety of different types of devices, for example, including micro browser cellular phones, or other types of devices, for example, that may be included in a digital mobile network. The mobile device, for example, may include messaging capability. The foregoing techniques may be used to provide for the interconnection of devices which are new as well as legacy older technologically based communication devices. Additionally, these devices for source and point of destination may be included in independent mobile operator networks, for example, each in accordance with their own standards and protocols. The user who is sending and receiving the messages has the advantage of having the processor forwarding a message in a streamline fashion using the foregoing techniques. The foregoing techniques may apply to a sender sending a message to one or more recipients.

The foregoing techniques consult a database to obtain information in accordance with a specified message recipient. The information may include, for example, country wide MIN format, an inquiry as to whether the database includes information corresponding to the particular recipient, and routing information associated with the digital mobile network of the particular recipient. Routing information may include, for example, message body format information and electronic mailing addressing format information. Checks may also be made to verify the length of the message sent and to be forwarded. Logging of all steps provides the framework to a billing and operator consolidation platform.

The foregoing techniques may also be used in sending electronic messages using a server between users in different digital mobile networks or pulling content using host or remote servers. A user may obtain information, such as, for example, weather and stock information, by "pulling" the information using the server. The user may communicate directly with the server to obtain the information requested. Alternatively, a user may communicate to the user's host SMSC. The server may then poll the host SMSC to receive the user's request for information. Also, applications, such as those requiring server processing of the received requests, may be sent back to the requesting party, or sent on to third parties. An example of such application is a Ringtone, a short musical theme used as the ringer on mobile devices. Such a ringtone may be requested by sending a message with the tones name or catalogue number to the central server. The central server then processes the request and returns the specially coded ringtone to the mobile device.

It should be noted that in the foregoing, a front end interface may be included in an embodiment, for example, using standard Internet protocols, allowing a user to enter and send messages using web-pages in accordance with configurations associated with, for example, FIGS. 1 and 1A. These web pages may be "served" to a user by the server 24.

Referring now to FIG. 9, shown is a more detailed example of stuffing table 402 of FIG. 8.

Referring now to FIG. 10, shown is a more detailed example of a Celcos table 404 of FIG. 8.

Referring now to FIG. 11, shown is a more detailed example of the Numbers table 406 of FIG. 8.

Referring now to FIG. 12, shown is a more detailed example of the Msg_type table 408 of FIG. 8. It should be noted that FIG. 12 includes an additional field in this example, the application destination field 408d which, in this example, may be used as an extension to the comments field for informational purposes.

Referring now to FIG. 13, shown is a more detailed description of the Country_specs table 410 of FIG. 8.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for routing a message from a sender in a first digital mobile network employing a first digital mobile network protocol to an intended receiver in a second different digital mobile network, the second digital mobile network employing a second digital mobile network protocol that is different from the first network protocol, the message comprising a message body and associated message routing information, the method comprising:
    forwarding said message to a server from said sender, said server being connectable to said first and said second digital mobile network;
    relating, using a routing database, a receiver identifier, the receiver identifier being contained in the associated message routing information and associated with the intended receiver, to corresponding routing format information associated with the second digital mobile network protocol, the routing format information associated with the second digital mobile network protocol comprising at least a second protocol mobile carrier interface format type and a second protocol mobile carrier addressing format type;
    reformatting said associated message routing information into a format specified by said corresponding routing format information, wherein the reformatting is transparent to a sender and receiver of the message and the message body remains unchanged, by the steps of:
        translating the receiver identifier to a destination address that conforms to the second protocol mobile carrier addressing format type;
        placing the destination address into a reformatted message that has a structure that conforms to the second protocol mobile carrier interface format type; and
        placing the message body unchanged into the reformatted message in a manner that conforms to the second protocol mobile carrier interface format type; and
    forwarding said reformatted message to said receiver in accordance with the reformatted associated message routing information.

2. The method of claim 1, wherein said message is a short message service message.

3. The method of claim 1, wherein the sender sends the message and the receiver receives the message using at least one of:
    digital mobile device connected to the internet, digital mobile device connected to the server through a service center of an associated mobile network operator, and computer system connected to the internet.

4. The method of claim 1, further comprising:
    performing a first query using the routing database to determine a countrywide mobile identification number format of a country associated with the receiver.

5. The method of claim 4, further comprising:
    performing a second query using the routing database to determine if information identifying the receiver is included in the routing database.

6. The method of claim 5, further comprising:
    performing a third query using the routing database to determine said routing information associated with the second digital mobile network of the receiver, said routing information including at least one of:
        format of a message, electronic mail address format, and message delivery method.

7. The method of claim 6, wherein routing information including a message delivery method uses one of:
    a direct connection to an operator, an application, and e-mail connection.

8. The method of claim 1, further comprising:
    polling said server by the sender for data.

9. The method of claim 8, further comprising:
    communicating a request for data to said server.

10. The method of claim 9, wherein said communicating a request for data to said server further comprises:
    directly sending a message to the server requesting information.

11. The method of claim 9, wherein said communicating a request for data to said server, further comprises:
    communicating the request for data to a messaging service center in said first digital mobile network;
    polling, by said server, the messaging service center for the request; and
    transmitting the request to said server.

12. The method of claim 11, wherein the request includes a keyword, said keyword being one of: a command and a phone number.

13. The method of claim 12, wherein the request is for at least one of:
    stock information, weather information for a particular location identified in the message, and an application.

14. The method of claim 13, wherein a requested application is at least one of:
    a game, ringtones in connection with audio tones, and a chat service.

15. The method of claim 1, wherein said sender is sending the message to a plurality of users, each of said plurality of users receiving the message being on different digital mobile networks.

16. The method of claim 15, further comprising:
    determining which of said plurality of users receiving the message are included in a buddy list, said buddy list including user specific information for message recipients; and
    reformatting said message in accordance with a format associated with a particular digital mobile networks network for each of said plurality of users on different digital mobile networks.

17. The method of claim 16, further comprising:
    determining if a message recipient is within the first digital mobile network of said sender.

18. The method of claim 17, further comprising:
    reformatting an electronic mailing address from a first format associated with said first digital mobile network to a second format associated with the second digital mobile network.

19. The method of claim 1, wherein said computer system includes said server and a plurality of different digital mobile networks, said plurality of different digital mobile networks including said first and said second digital mobile networks, communications within said computer system being represented as a hub-like structure with said server as the center and each of said plurality of digital mobile networks being a spoke extending from said server, all communications between any two of said plurality of digital mobile networks being facilitated by said server.

20. The method of claim 19, wherein the message is sent between a sender and receiver independent of operator, location, and network protocols using said server.

21. A computer program product for routing a message from a sender in a first digital mobile network employing a first digital mobile network protocol to an intended receiver in a second different digital mobile network, the second digital mobile network employing a second digital mobile network protocol that is different from the first network protocol, the message comprising a message body and associated message routing information, the method comprising:
  machine executable code for forwarding said message to a server from said sender, said server being connectable to said first and said second digital mobile networks;
  machine executable code for relating, using a routing database, a receiver identifier, the receiver identifier being contained in the associated message routing information and associated with the intended receiver to corresponding routing format information associated with the second digital mobile network protocol, the routing format information associated with the second digital mobile network protocol comprising at least a second protocol mobile carrier interface format type and a second protocol mobile carrier addressing format type;
  machine executable code for reformatting said associated message routing information into a format specified by said corresponding routing format information, wherein the reformatting is transparent to a sender and receiver of the message and the message body remains unchanged, by the steps of:
    translating the receiver identifier to a destination address that conforms to the second protocol mobile carrier addressing format type;
    placing the destination address into a reformatted message that has a structure that conforms to the second protocol mobile carrier interface format type; and
    placing the message body unchanged into the reformatted message in a manner that conforms to the second protocol mobile carrier interface format type; and
  machine executable code for forwarding said reformatted message to said receiver in accordance with the reformatted associated message routing information.

22. The computer program product of claim 21, wherein said message is a short message service message.

23. The computer program product of claim 21, wherein the sender sends the message and the receiver receives the message using at least one of:
  digital mobile device connected to the internet, digital mobile device connected to the server through a service center of an associated mobile network operator, and computer system connected to the internet.

24. The computer program product of claim 21, further comprising:
  machine executable code for performing a first query using the routing database to determine a countrywide mobile identification number format of a country associated with the receiver.

25. The computer program product of claim 24, further comprising:
  machine executable code for performing a second query using the routing database to determine if information identifying the receiver is included in the routing database.

26. The computer program product of claim 25, further comprising:
  machine executable code for performing a third query using the routing database to determine said routing information associated with the second digital mobile network of the receiver, said routing information including at least one of:
  format of a message, electronic mail address format, and message delivery method.

27. The computer program product of claim 21, further comprising:
  machine executable code for polling, by the sender, said server for data.

28. The computer program product of claim 27, further comprising:
  machine executable code for communicating a request for data to said server.

29. The computer program product of claim 28, wherein said machine executable code for communicating a request for data to said server further comprises:
  machine executable code for directly sending a message to the server requesting information.

30. The computer program product of claim 28, wherein said machine executable code for communicating a request for data to said server, further comprises machine executable code for:
  communicating the request for data to a messaging service center in said first digital mobile network;
  polling, by said server, the messaging service center for the request; and
  transmitting the request to said server.

31. The computer program product of claim 30, wherein the request includes a keyword, said keyword being one of: a command and a phone number.

32. The computer program product of claim 30, wherein the request is for one of:
  stock information and weather information for a particular location identified in the message.

33. The computer program product of claim 21, wherein said sender is sending the message to a plurality of users, each of said plurality of users receiving the message being on different digital mobile networks.

34. The computer program product of claim 33, further comprising:
  machine executable code for determining which of said plurality of users receiving the message are included in a buddy list, said buddy list including user specific information for message recipients; and
  machine executable code for reformatting said message in accordance with a format associated with a particular digital mobile network for each of said plurality of users on different digital mobile networks.

35. The computer program product of claim 34, further comprising:
  machine executable code for determining if a message recipient is within the first digital mobile network of said sender.

36. The computer program product of claim 35, further comprising:
  machine executable code for reformatting an electronic mailing address from a first format associated with said first digital mobile network to a second format associated with the second digital mobile network.

37. The computer program product of claim 21, wherein said computer system includes said server and a plurality of different digital mobile networks, said plurality of different digital mobile networks including said first and said second digital mobile networks, communications within said computer system being represented as a hub-like structure with said server as the center and each of said plurality of digital mobile networks being a spoke extending from said server, all communications between any two of said plurality of digital mobile networks being facilitated by said server.

38. The computer program product of claim 37, wherein the message is sent between a sender and receiver independent of operator, location, and network protocols using said server.

* * * * *

UNITED STATES PATENT AND TRADEMARK OFFICE
CERTIFICATE OF CORRECTION

| | | |
|---|---|---|
| PATENT NO. | : 7,209,950 B2 | |
| APPLICATION NO. | : 09/921167 | |
| DATED | : April 24, 2007 | |
| INVENTOR(S) | : Simon Bennett et al. | |

It is certified that error appears in the above-identified patent and that said Letters Patent is hereby corrected as shown below:

Column 1, line 27, after "network operator network" insert -- of that --;
    line 34, delete "to" and insert -- with --.

Figure 2A:
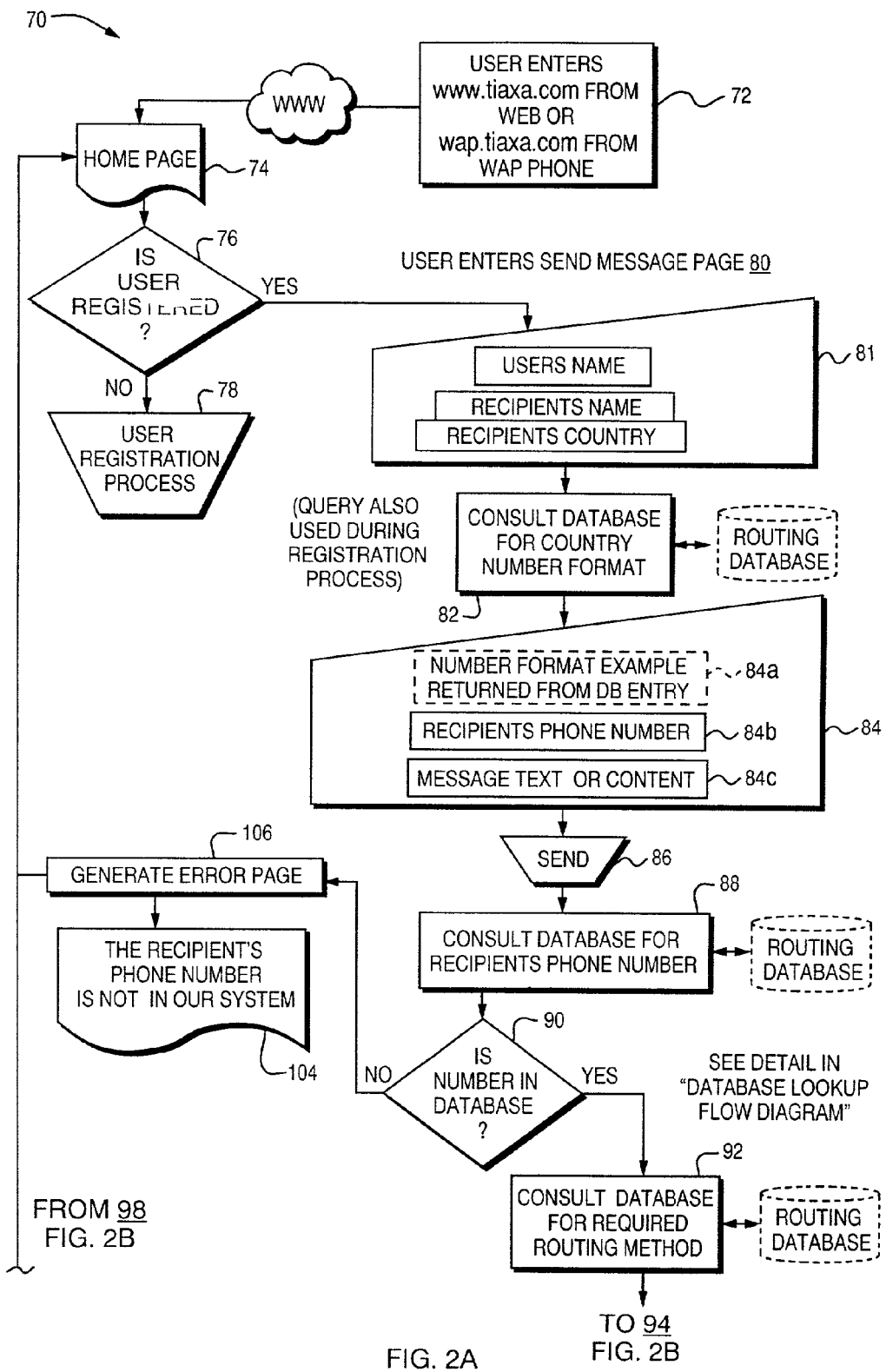
FIG. 2 is an example of an embodiment of a flowchart of steps of one embodiment of processing when a user connects from the internet sending a message to a user on an SMS communication device.
Figure 2B:
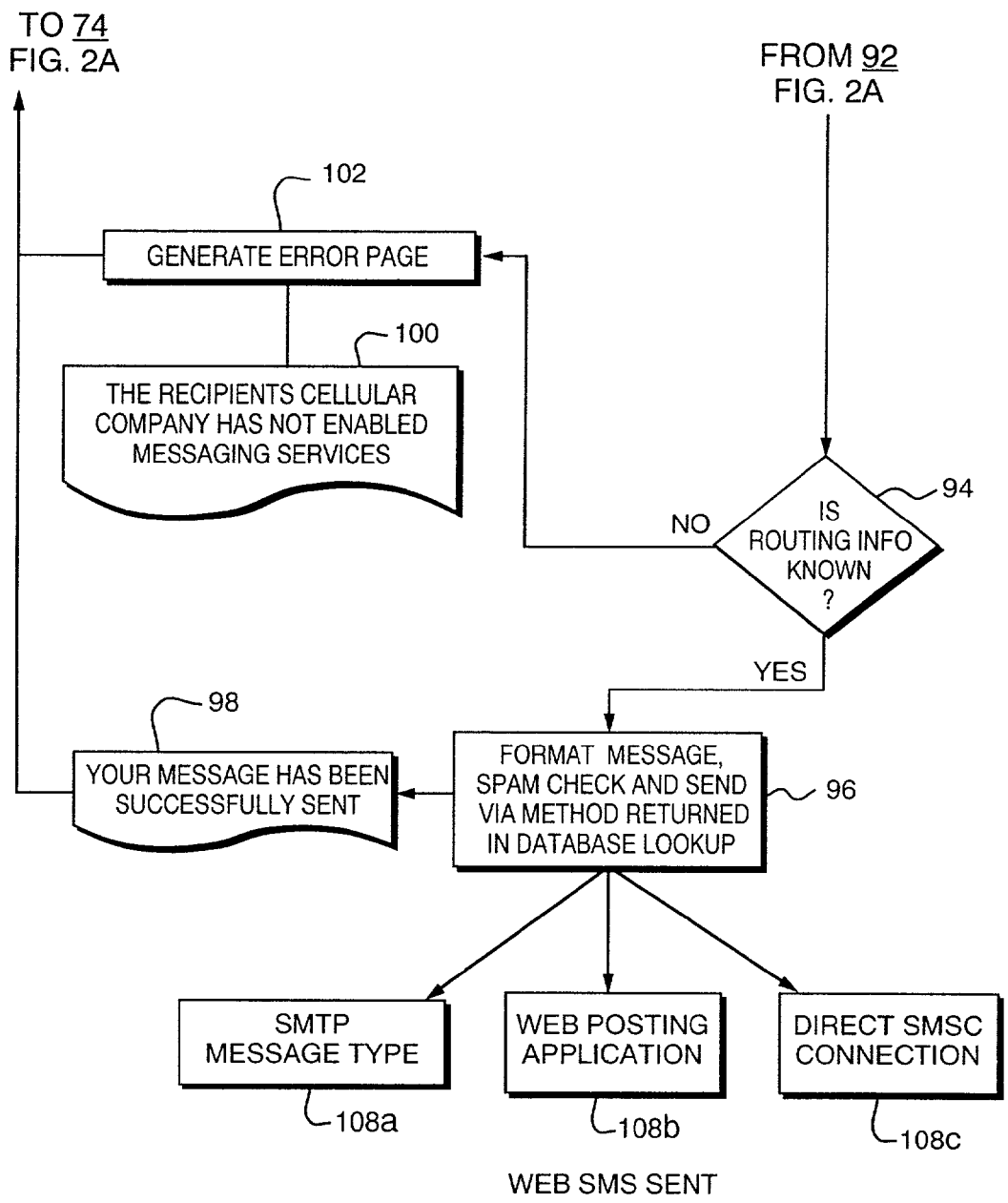
Figure 3A:
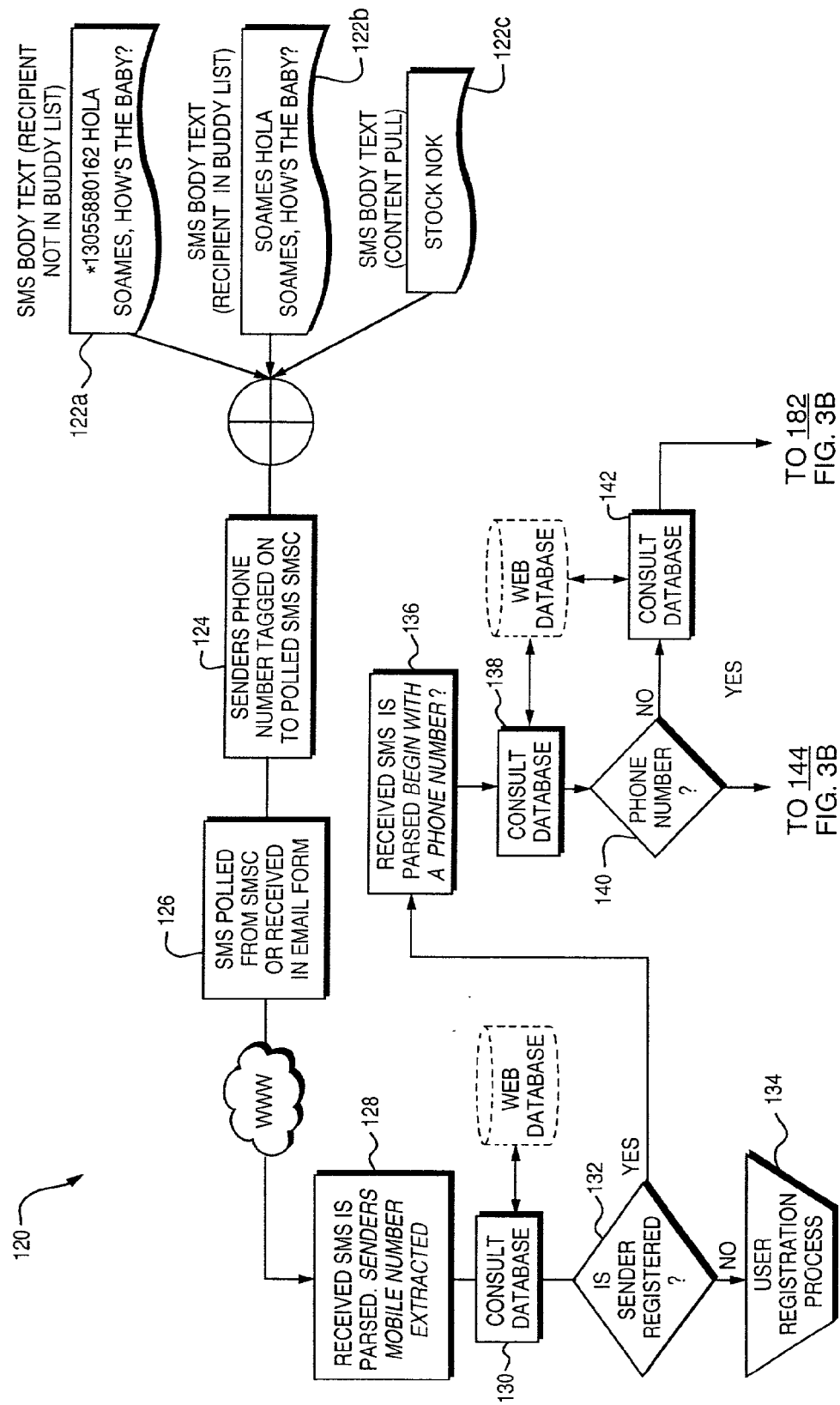
FIG. 3 is an example of an embodiment of a flowchart of steps of one embodiment when an MO SMS (Mobile originating SMS) user sends a message to a receiver using an SMS device the receiver possibly residing on a different network.
Figure 3C:
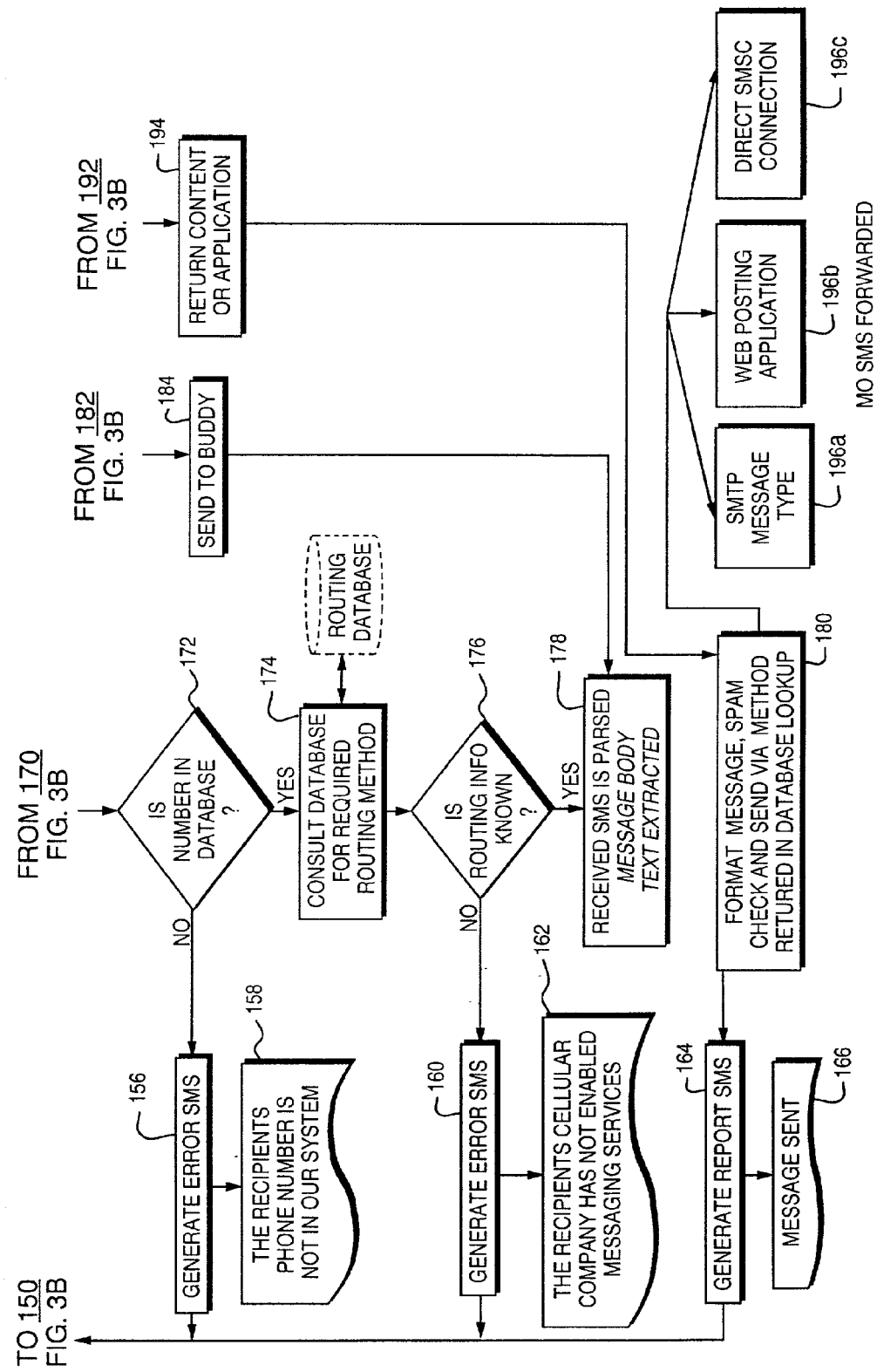

Column 2, line 32, delete "FIG. 2 is" and insert -- FIGS. 2A and B depict --.
    line 36, delete "FIG. 3 is" and insert -- FIGS. 3A-C depict --.
    line 41, delete "FIG. 4 is" and insert -- FIGS. 4A and B depict --.

Column 10, line 5, delete "FIG. 2" and insert -- FIGS. 2A and 2B --;
    line 10, delete "FIG. 2" and insert -- FIGS. 2A and 2B --.
    line 44, delete "Fig. 2" and insert -- FIG. 2A --.

Column 11, line 12, delete "Fig. 2" and insert -- FIG. 2A --.

Column 12, line 29, delete "FIG. 2" and insert -- FIGS. 2A and 2B --.
    line 56, delete "FIG. 2" and insert -- FIGS. 2A and 2B --;
    line 61, delete "FIG. 2" and insert -- FIGS. 2A and 2B --;
    line 63, delete "FIG. 3" and insert -- FIGS. 3A-C --;
    line 67 and at column 13, line 1, delete "FIG. 3" and insert -- FIGS. 3A-C --.

Column 13, line 43, delete "FIG. 3" and insert -- FIG. 3A --;
    line 59, delete "FIG. 3" and insert -- FIG. 3A --.

Figure 4B:
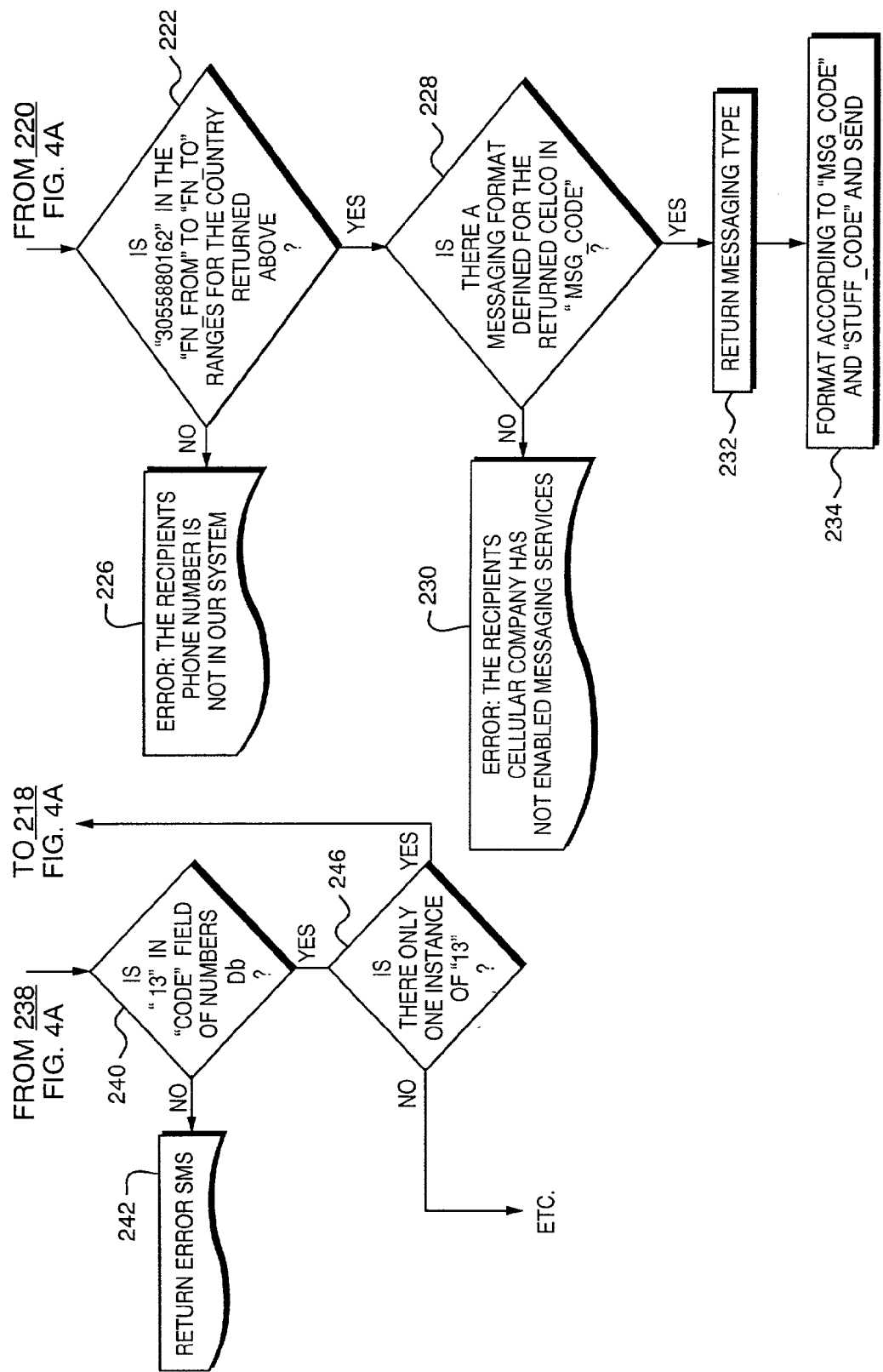
FIG. 4 is a flowchart of steps of one embodiment of how to determine routing information.

Column 15, line 31, delete "FIG. 2" and insert -- FIGS. 2A and 2B --;
    line 36, delete "FIG. 2", first occurrence and insert -- FIG. 2B --;
    lines 36 and 37, delete "FIG. 2" and insert -- FIGS. 2A and 2B --.
    line 56, delete "FIG. 4" and insert -- FIGS. 4A and 4B --.

Column 16, line 29, delete "FIG. 2" and insert -- FIGS. 2A and 2B --;
    line 34, delete "FIG. 2" and insert -- FIG. 2B --.

Signed and Sealed this
Seventeenth Day of May, 2011

David J. Kappos
*Director of the United States Patent and Trademark Office*

CERTIFICATE OF CORRECTION (continued)
U.S. Pat. No. 7,209,950 B2 line 37, delete "FIG. 3" and insert -- FIGS. 3A-C --;
line 42, delete "FIG. 2" and insert -- FIGS. 2A and 2B --.

Column 17, line 13, delete "FIG. 3" and insert -- FIGS. 3A-C --.
line 52, delete "FIG. 3" and insert -- FIGS. 3A-C --.

Column 18, line 8, delete "FIG. 4" and insert -- FIGS. 4A and 4B --;
line 13, "FIG. 4" and insert -- FIGS. 4A and 4B --.

Column 21, line 15, delete "the FIG. 300" and insert -- FIG. 5 --.

Column 23, line 56, delete "360" and after "FIG. 7" insert -- 360 --.

Column 25, line 66 delete "FIG. 4" and insert -- FIG. 4A --.

Column 29, line 6, cancel the text beginning with "1. A method executed" to and ending "routing information." in column 29, line 44, and insert the following claim:

-- 1. A method executed in a computer system for routing a message from a sender in a first digital mobile network employing a first digital mobile network protocol to an intended receiver in a second different digital mobile network, the second digital mobile network employing a second digital mobile network protocol that is different from the first network protocol, the message comprising a message body and associated message routing information, the method comprising:
forwarding said message to a server from said sender, said server being connectable to said first and said second digital mobile network;
relating, at the application layer using a routing database, a receiver identifier, the receiver identifier being contained in the associated message routing information and associated with the intended receiver, to a method associated with a network connection type associated with the second digital mobile network and corresponding routing format information associated with the second digital mobile network protocol, the routing format information associated with the second digital mobile network protocol comprising at least a second protocol mobile carrier interface format type and a second protocol mobile carrier addressing format type;
reformatting said associated message routing information into a format specified by said corresponding routing format information, wherein the reformatting is transparent to a sender and receiver of the message and the message body remains unchanged, by the steps of:
translating the receiver identifier to a destination address that conforms to the second protocol mobile carrier addressing format type;
placing the destination address into a reformatted message that has a structure that conforms to the second protocol mobile carrier interface format type; and
placing the message body unchanged into the reformatted message in a manner that conforms to the second protocol mobile carrier interface format type; and
forwarding said reformatted message to said receiver in accordance with the method associated with the network connection type and the reformatted associated message routing information. --

CERTIFICATE OF CORRECTION (continued)
U.S. Pat. No. 7,209,950 B2

Column 29, line 57, cancel the text beginning with "5. The method of claim 4" to and ending "included in the routing database." at line 60 and insert the following claim:

-- 5. The method of claim 1, the step of relating further comprising:
performing a query using the routing database to determine a countrywide mobile identification number format of a country associated with the receiver. --

Column 29, line 61, cancel the text beginning with "6. The method of claim 5" to and ending "and message delivery method." at line 67 and insert the following claim:

-- 6. The method of claim 1 the step of relating further comprising:
performing a query using the routing database to determine if information related to the receiver is included in the routing database and returning an error message if the information is not found. --

Column 30, line 1, cancel the text beginning with "7. The method of claim 6" to and ending "e-mail connection." at line 4 and insert the following claim:

-- 7. The method of claim 1, the step of relating further comprising:
performing a query using the routing database to determine said routing information associated with the second digital mobile network of the receiver, said routing information including at least;
an electronic mail address format. --

Column 30, line 5, cancel the text: "8. The method of claim 1, further comprising: polling said server by the sender for data." and insert the following claim:

-- 8. The method of claim 1, wherein the method associated with the network connection type uses at least one of:
a direct connection to an operator, an application, and an e-mail connection. --

Column 30, line 62, cancel the text beginning with: "21. A computer program product" to and ending "associated message routing information." and insert the following claim:

-- 21. A computer program product stored on a computer storage media for routing a message from a sender in a first digital mobile network employing a first digital mobile network protocol to an intended receiver in a second different digital mobile network, the second digital mobile network employing a second digital mobile network protocol that is different from the first network protocol, the message comprising a message body and associated message routing information, comprising:
machine executable code for forwarding said message to a server from said sender, said server being connectable to said first and said second digital mobile networks;
machine executable code for relating, at the application layer using a routing database, a receiver identifier, the receiver identifier being contained in the associated message routing information and associated with the intended receiver to a method associated with a network connection type associated with the second digital mobile network and corresponding routing format information associated with the second digital mobile network protocol, the routing format information associated with the second digital mobile network protocol comprising at least a second protocol mobile carrier interface format type and a second protocol mobile carrier addressing format type;

machine executable code for reformatting said associated message routing information into a format specified by said corresponding routing format information, wherein the reformatting is transparent to a sender and receiver of the message and the message body remains unchanged, translating the receiver identifier to a destination address that conforms to the second protocol mobile carrier addressing format type , placing the destination address into a reformatted message that has a structure that conforms to the second protocol mobile carrier interface format type, and placing the message body into the reformatted message in a manner that conforms to the second protocol mobile carrier interface format type; and machine executable code for forwarding said reformatted message to said receiver in accordance with the method associated with the network connection type and the reformatted associated message routing information. --

Column 31, line 46, cancel the text beginning with "24. The computer program product of claim 21" to and ending "associated with the receiver.", and insert the following claim:

-- 24. The computer program product of claim 21, further comprising:
machine executable code for performing a query using the routing database to determine a countrywide mobile identification number format of a country associated with the receiver. --

Column 31, line 52, cancel the text beginning with "25. The computer program product" to and ending "included in the routing database.", and insert the following claim:

-- 25. The computer program product of claim 21, further comprising:
machine executable code for performing a query using the routing database to determine if information related to the receiver is included in the routing database and returning an error message if the information is not found. --

Column 31, line 58, cancel the text beginning with "26. The computer program product" to and ending "and message delivery method.", and insert the following claim:

-- 26. The computer program product of claim 25, further comprising:
machine executable code for performing a query using the routing database to determine said routing information associated with the second digital mobile network of the receiver, said routing information including at least
an electronic mail address format. --